United States Patent
Livesey et al.

(10) Patent No.: US 10,313,236 B1
(45) Date of Patent: Jun. 4, 2019

(54) METHOD OF FLOW BASED SERVICES FOR FLASH STORAGE

(71) Applicant: Sanmina Corporation, San Jose, CA (US)

(72) Inventors: Jon Livesey, San Jose, CA (US);
Sharad Mehrotra, Saratoga, CA (US);
Thomas Gourley, San Jose, CA (US);
Julian Ratcliffe, San Jose, CA (US);
Jack Mills, San Carlos, CA (US)

(73) Assignee: Sanmina Corporation, San Jose, CA (US)

( * ) Notice: Subject to any disclaimer, the term of this patent is extended or adjusted under 35 U.S.C. 154(b) by 976 days.

(21) Appl. No.: 14/321,262

(22) Filed: Jul. 1, 2014

Related U.S. Application Data

(60) Provisional application No. 61/922,557, filed on Dec. 31, 2013.

(51) Int. Cl.
*H04L 12/741* (2013.01)
*H04L 12/801* (2013.01)

(52) U.S. Cl.
CPC .............. *H04L 45/74* (2013.01); *H04L 47/17* (2013.01)

(58) Field of Classification Search
None
See application file for complete search history.

(56) References Cited

U.S. PATENT DOCUMENTS

| | | | |
|---|---|---|---|
| 5,615,329 A | 3/1997 | Kern et al. | |
| 5,724,501 A | 3/1998 | Dewey et al. | |
| 6,061,750 A | 5/2000 | Beardsley et al. | |
| 6,173,367 B1 | 1/2001 | Aleksic et al. | |
| 6,205,507 B1 | 3/2001 | Elkhoury et al. | |
| 6,460,122 B1 | 10/2002 | Otterness et al. | |
| 6,529,963 B1* | 3/2003 | Fredin | H04L 49/357 |
| | | | 703/21 |
| 6,820,171 B1 | 11/2004 | Weber et al. | |

(Continued)

FOREIGN PATENT DOCUMENTS

WO    WO-2009143381 A2    11/2009

OTHER PUBLICATIONS

Title: "Intelligent I/O (I2O) Architecture Specification"; Publisher: I2O Special Interest Group; Version: Draft Revision 1.5; Date: Mar. 1997; pp. 2.*

(Continued)

*Primary Examiner* — Tim T Vo
*Assistant Examiner* — Christopher A Bartels
(74) *Attorney, Agent, or Firm* — Schwegman Lundberg & Woessner, P.A.

(57) ABSTRACT

A method is provided for use with a packet routing network in which one or more endpoints includes Flash storage; multiple endpoints are configured to impart services to packets; a distributed routing structure is provided that includes routing structure portions that are associated with endpoints and that indicate next hop destination endpoint addresses that collectively define multiple sequences of endpoints that each includes one or more endpoints configured to impart a service and an endpoint that includes Flash storage; packets received from an external network are propagated through defined sequences of endpoints; services are imparted to a received packet by endpoints that receive it in the course of its propagation.

25 Claims, 18 Drawing Sheets

(56) References Cited

U.S. PATENT DOCUMENTS

| | | | |
|---|---|---|---|
| 6,928,514 B2 | 8/2005 | Chatterjee et al. | |
| 6,983,396 B2 | 1/2006 | Brant et al. | |
| 7,660,306 B1* | 2/2010 | Eiriksson | H04L 12/4641 370/392 |
| 7,836,204 B2 | 11/2010 | Kalos et al. | |
| 8,117,376 B2 | 2/2012 | Hemmi | |
| 8,218,770 B2* | 7/2012 | Arulambalam | G06F 21/72 380/277 |
| 9,118,698 B1 | 8/2015 | Radovanovic | |
| 9,164,914 B1 | 10/2015 | Zhou et al. | |
| 9,286,225 B2 | 3/2016 | Mehrotra et al. | |
| 9,304,902 B2 | 4/2016 | Mehrotra et al. | |
| 9,509,604 B1 | 11/2016 | Livesey et al. | |
| 9,672,180 B1 | 6/2017 | Morshed et al. | |
| 2002/0156612 A1* | 10/2002 | Schulter | G06F 9/5066 703/22 |
| 2002/0172195 A1* | 11/2002 | Pekkala | H04L 49/103 370/360 |
| 2002/0196796 A1 | 12/2002 | Ambe et al. | |
| 2003/0041211 A1* | 2/2003 | Merkey | G06F 11/1076 711/114 |
| 2003/0084248 A1 | 5/2003 | Gaither et al. | |
| 2004/0010545 A1* | 1/2004 | Pandya | H04L 29/06 709/203 |
| 2004/0030712 A1* | 2/2004 | Sano | H04L 45/38 |
| 2004/0193800 A1 | 9/2004 | Krehbiel, Jr. et al. | |
| 2005/0240809 A1 | 10/2005 | Ash et al. | |
| 2006/0031639 A1 | 2/2006 | Benhase | |
| 2006/0136685 A1* | 6/2006 | Griv | G06F 11/2064 711/162 |
| 2006/0193327 A1* | 8/2006 | Arndt | G06F 9/45537 370/395.21 |
| 2006/0195663 A1* | 8/2006 | Arndt | G06F 3/0605 711/153 |
| 2006/0242354 A1 | 10/2006 | Johnsen et al. | |
| 2006/0251067 A1* | 11/2006 | DeSanti | H04L 29/12801 370/389 |
| 2007/0156966 A1 | 7/2007 | Sundarrajan et al. | |
| 2008/0137676 A1* | 6/2008 | Boyd | H04L 49/25 370/419 |
| 2008/0192648 A1* | 8/2008 | Galles | H04L 69/32 370/254 |
| 2008/0301256 A1 | 12/2008 | McWilliams et al. | |
| 2009/0016236 A1 | 1/2009 | Alcala et al. | |
| 2009/0164700 A1 | 6/2009 | Chen et al. | |
| 2010/0080117 A1 | 4/2010 | Coronado et al. | |
| 2010/0241807 A1 | 9/2010 | Wu et al. | |
| 2010/0281258 A1 | 11/2010 | Andress et al. | |
| 2011/0029717 A1 | 2/2011 | Moshayedi | |
| 2011/0191535 A1 | 8/2011 | Yuasa | |
| 2011/0238938 A1 | 9/2011 | Kloeppner et al. | |
| 2011/0258636 A1 | 10/2011 | Chopra et al. | |
| 2011/0320662 A1* | 12/2011 | Craddock | G06F 9/45537 710/263 |
| 2012/0023282 A1 | 1/2012 | Rub | |
| 2012/0079199 A1 | 3/2012 | Beardsley et al. | |
| 2012/0166582 A1* | 6/2012 | Binder | H04L 63/18 709/217 |
| 2013/0042066 A1 | 2/2013 | Price | |
| 2013/0286846 A1 | 10/2013 | Atlas et al. | |
| 2013/0311706 A1 | 11/2013 | Okada et al. | |
| 2013/0346624 A1 | 12/2013 | Chervets et al. | |
| 2014/0040677 A1 | 2/2014 | Matsui | |
| 2014/0095785 A1 | 4/2014 | Nataraj | |
| 2014/0189074 A1 | 7/2014 | Parker | |
| 2014/0189212 A1 | 7/2014 | Slaight et al. | |
| 2014/0192819 A1 | 7/2014 | Nishimura et al. | |
| 2014/0217999 A1 | 8/2014 | Wibben et al. | |
| 2014/0244876 A1 | 8/2014 | Colpo et al. | |
| 2014/0281140 A1* | 9/2014 | Mehrotra | G06F 12/0246 711/103 |
| 2014/0281153 A1 | 9/2014 | Mehrotra et al. | |
| 2014/0341029 A1 | 11/2014 | Allan et al. | |
| 2015/0067253 A1 | 3/2015 | Madhusudana et al. | |
| 2015/0095696 A1 | 4/2015 | Hess et al. | |
| 2015/0124611 A1 | 5/2015 | Attar et al. | |
| 2015/0127797 A1 | 5/2015 | Attar et al. | |
| 2015/0138973 A1 | 5/2015 | Kumar et al. | |
| 2016/0117281 A1 | 4/2016 | Akaike et al. | |
| 2016/0132242 A1 | 5/2016 | Mehrotra et al. | |
| 2016/0259568 A1* | 9/2016 | Grimsrud | G06F 3/0613 |

OTHER PUBLICATIONS

"U.S. Appl. No. 13/844,663, Non Final Office Action dated Dec. 24, 2014", 8 pgs.

"U.S. Appl. No. 13/844,663, Notice of Allowance dated Jul. 6, 2015", 7 pgs.

"U.S. Appl. No. 13/844,663, Response filed Apr. 24, 2015 to Non Final Office Action dated Dec. 24, 2014", 13 pgs.

"U.S. Appl. No. 13/931,650, Non Final Office Action dated Mar. 11, 2015", 23 pgs.

"U.S. Appl. No. 13/931,650, Notice of Allowance dated Sep. 25, 2015", 8 pgs.

"U.S. Appl. No. 13/931,650, Notice of Allowance dated Nov. 9, 2015", 5 pgs.

"U.S. Appl. No. 13/931,650, Response filed Jun. 22, 2015 to Non Final Office Action dated Mar. 11, 2015", 10 pgs.

"U.S. Appl. No. 14/321,317, Non Final Office Action dated Mar. 16, 2016", 8 pgs.

"U.S. Appl. No. 14/321,317, Notice of Allowability dated Oct. 14, 2016", 2 pgs.

"U.S. Appl. No. 14/321,317, Notice of Allowance dated Jul. 18, 2016", 7 pgs.

"U.S. Appl. No. 14/321,317, Response filed Jun. 23, 2016 to Non Final Office Action dated Mar. 16, 2016", 14 pgs.

"U.S. Appl. No. 14/552,329, Non Final Office Action dated Jul. 20, 2016", 19 pgs.

"U.S. Appl. No. 14/552,329, Notice of Allowance dated Oct. 28, 2016", 6 pgs.

"U.S. Appl. No. 14/552,329, Response filed Oct. 20, 2016 Non Final Office Action dated Jul. 20, 2016", 13 pgs.

"U.S. Appl. No. 14/949,518, PTO Response to Rule 312 Communication dated Oct. 14, 2016", 1 pg.

"ExpressFabric(r) PCI Express as a Converged, Rack-Level Interconnect", PLX Technology, (May 2013), 1-16.

"HP Moonshot System", Family Data Sheet (c) 2013 Hewlett-Packard Development Company, (Apr. 2013), 8 pgs.

"HP Moonshot System—Technical White Paper", (c) 2013 Hewlett-Packard Development Company, (2013), 1-8.

"HP Moonshot: An Accelerator for Hyperscale Workloads", (c) 2013 Moor Insights & Strategy, (2013), 9 pgs.

"Juniper Networks QFabric: Scaling for the Modern Data Center", (c) 2011 ACG Research, (2011), 1-9.

"Non-Transparent Bridging Simplied—Multi-Host System and Intelligent I/O Design with PCI Express", (c) 2004 PLX Technology, Inc., (2004), 4 pgs.

"Product Overview—Brief Overview of the Product Families & Applications", PLX Technology, (May 2013), 1-46.

"QFabric tm System", (c) 2013 Juniper Networks, Inc., (Jun. 2013), 12 pgs.

"Technology Brief PCI Express", PLX Technology, (2003), 5 pgs.

"The data center of tomorrow: How disruptive will new technologies be?", (c) 2013 Goldman Sachs, (Apr. 10, 2013), 1-34.

"White Paper: Egenera Cloud Suite", (c) 2013 Egenera Inc., (2013), 8 pgs.

Blake, Bob, "Choosing the Right Programmable Logic Solution for PCI Express Applications", [online]. Retrieved from the Internet: <URL: http://www.rtcmagazine.com/articles/view/100327>, (Apr. 2005), 1-7.

Budruk, Ravi, "PCI Express(r) Basics", (c) 2007, PCI-SIG, (2007), 40 pgs.

Hutchinson, Lee, "The SSD Revolution / An ARS Technica Feature", Solid-state revolution: in-depth on how SSDs really work, (Jun. 4, 2012), 1-27.

Morgan, Timothy P., "Til heftier engines come aboard, HP Moonshot only about clouds", [online]. [retrieved on Apr. 9, 2013].

(56) References Cited

OTHER PUBLICATIONS

Retrieved from the Internet: <URL: http://www.theregister.co.uk/2013/04/09/hp_moonshot_server_analysis/>, (Apr. 9, 2013), 1-8.

Myslewski, Rik, "HP wants to help you mount a Moonshot", [onlline]. [retrieved on Nov. 3, 2013]. Retrieved from the Internet: <URL: http://www.theregister.co.uk/2013/11/02/hp_pathfinder_innovation_ecosystem_and_discovery_lab/>, (2013), 3 pgs.

Regula, Jack, "Using Non-transpatent Bridging in PCI Express Systems", PLX Technology, Inc., (Jun. 1, 2004), 1-31.

Vahdat, Amin, "The Emerging Optical Data Center", OSA/OFC/NFOEC 2011, (2011), 3 pgs.

"U.S. Appl. No. 14/552,329, Notice of Allowance dated Feb. 15, 2017", 5 pgs.

"U.S. Appl. No. 15/000,949, Non Final Office Action dated Mar. 23, 2017", 7 pgs.

"Intelligent I/O (I2O) Architecture Specification", Draft Revision, (Mar. 1997), 503 pgs.

"U.S. Appl. No. 14/321,218, Examiner Interview Summary dated Oct. 19, 2017", 3 pgs.

"U.S. Appl. No. 14/321,218, Non Final Office Action dated Jul. 20, 2017", 20 pgs.

"U.S. Appl. No. 14/321,218, Notice of Allowance dated Jan. 12, 2018", 11 pgs.

"U.S. Appl. No. 14/321,218, Response filed Oct. 19, 2017 to Non Final Office Action dated Jul. 20, 2017", 23 pgs.

"U.S. Appl. No. 15/000,949, Notice of Allowance dated Sep. 13, 2017", 8 pgs.

"U.S. Appl. No. 15/000,949, Response filed Jun. 23, 2017 to Non Final Office Action dated Mar. 23, 2017", 11 pgs.

\* cited by examiner

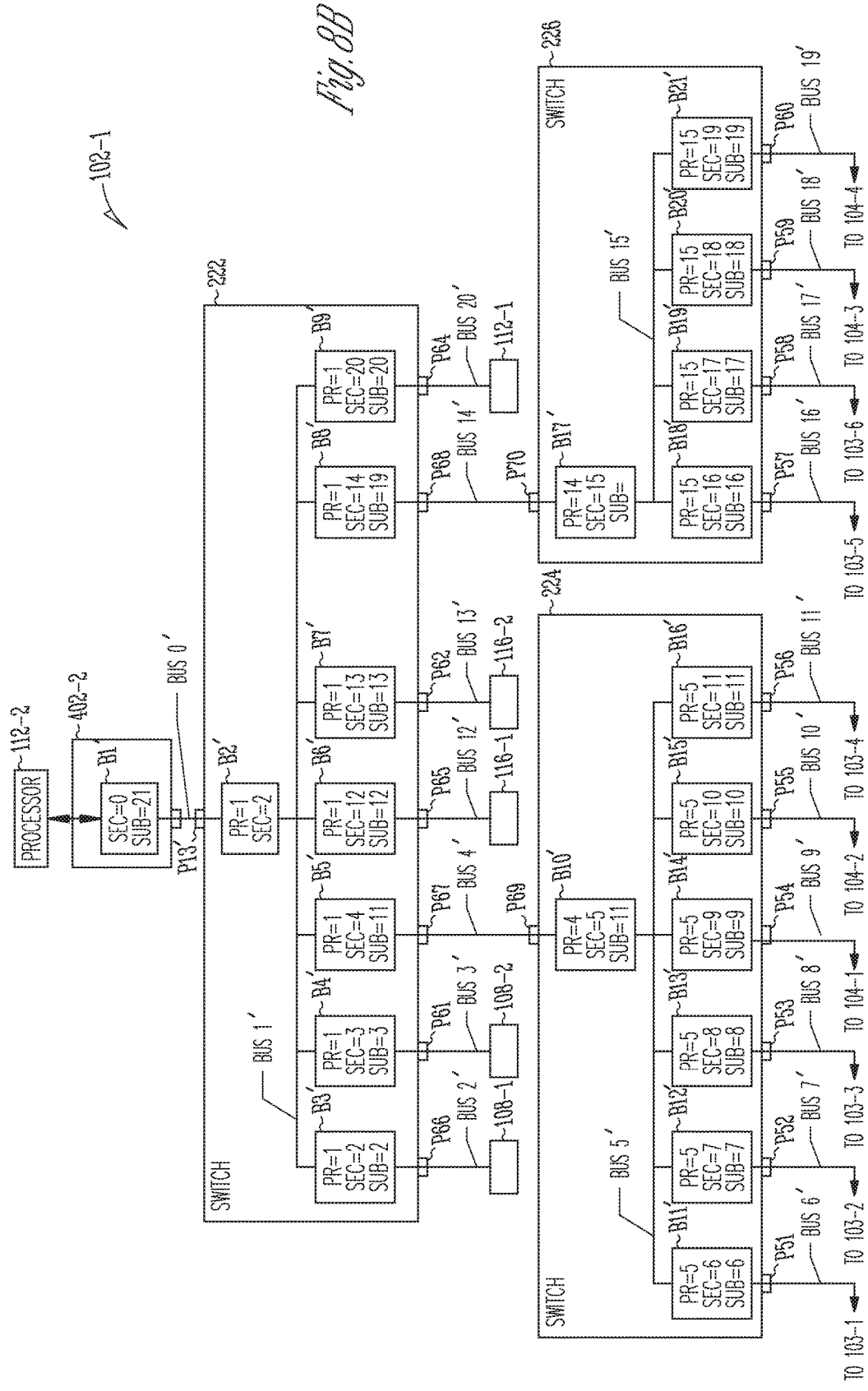

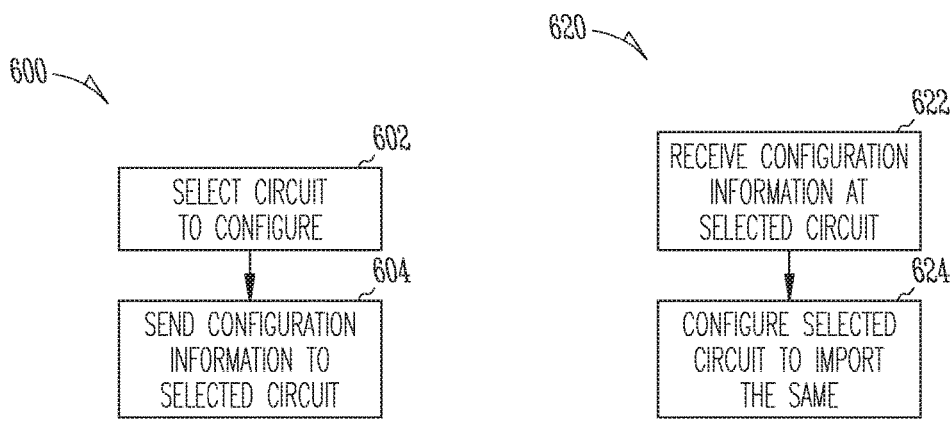

700 ↙

| FLOW ID | KEY | POLICY (SERVICE SEQUENCE) |
|---|---|---|
| 1A | COMMAND 1 LUN 1 | SVC A → SVC B → SVC C → SVC D → LUN 1 |
| 1B | COMMAND 1 LUN 2 | SVC A → SVC D → SVC E → SVC F → LUN 2 |
| 1C | COMMAND 1 LUN 3 | SVC A → SVC B → SVC F → SVC D → LUN 3 |
| ⋮ | ⋮ | ⋮ |
| 1F | COMMAND 3 LUN 4 | LUN 4 → SVC C → SVC B → SVC A → NIC |

| SERVICE A | |
|---|---|
| FLOW ID | NEXT HOP |
| 1A | SVC B |
| 1B | SVC D |
| 1C | SVC B |
| 1F | NIC |

| SERVICE B | |
|---|---|
| FLOW ID | NEXT HOP |
| 1A | SVC C |
| 1C | SVC F |
| 1F | SVC A |

| SERVICE C | |
|---|---|
| FLOW ID | NEXT HOP |
| 1A | SVC D |
| 1F | SVC B |

| SERVICE D | |
|---|---|
| FLOW ID | NEXT HOP |
| 1A | LUN 1 |
| 1B | SVC E |
| 1C | LUN 3 |

| SERVICE E | |
|---|---|
| 1B | SVC F |

| LUN 4 | |
|---|---|
| 1F | SVC C |

*Fig. 13F*

| | | |
|---|---|---|
| 1A | COMMAND 1 LUN 1 | SVC A |
| 1B | COMMAND 1 LUN 2 | SVC A |
| 1C | COMMAND 1 LUN 3 | SVC A |
| ⋮ | ⋮ | ⋮ |
| 1F | COMMAND 3 LUN 4 | LUN 4 |

METHOD OF FLOW BASED SERVICES FOR FLASH STORAGE

CROSS-REFERENCE TO RELATED APPLICATION

This claims priority to provisional application Ser. No. 61/922,557 filed Dec. 31, 2013, entitled, Compact Data Center with Dynamically Configurable Network of Flow Based Services for Flash Storage.

BACKGROUND

The large amounts of information generated daily challenge data handling facilities as never before. In the context of today's information generation, data is being generated at rates perhaps thousands or tens of thousands of times greater than was the data-generation rate in the 1990s. Historically, large volumes of data sparked explosive growth in data communications. Responses to growing amounts of data generation centered on improving the movement of data based in increased transmission data rates to enhance throughput in communication channels. For instance, transmission pipelines grew from a few tens of megabits-per-second (Mb/s) transmission rates to several tens of gigabits-per-second (Gb/s) rates during the 1990s.

In the same period, typical storage devices, such as hard disk drives (HDDs), when amassed in sufficient numbers, might accommodate large volumes of data, but the rates at which data could be stored and retrieved have not scaled at the same rate as the volume of data stored on the devices has increased. Data access rates for HDDs are at similar orders of magnitude today as they were in the '90s.

Fundamental storage subsystems have not integrated technology to enable scaling of effective data storage at the same rate that data generation is growing. Hence the challenge to systems handling large volumes of data is not likely to be alleviated by the combination of contemporary HDD technology with high-speed data transmission channels. In order to handle and manage big data, information processing facilities will be pressured to utilize larger volumes of storage with higher performance rates for capturing and accessing data.

SUMMARY

In one aspect, a method is provided for use with a packet routing network in which one or more endpoints includes Flash storage. Multiple endpoints are configured to impart services to packets. A distributed routing structure is provided that includes routing structure portions that are associated with endpoints and that indicate next hop destination endpoint addresses. The next hop destination endpoint addresses collectively define multiple sequences of endpoints that each includes one or more endpoints configured to impart a service and an endpoint that includes Flash storage. Packets received from an external network are associated with a defined sequence of endpoints, based at least in part upon a Flash storage location associated with the received packet. A packet is propagated through a sequence of endpoints. At each endpoint in the sequence, a current destination endpoint address within the received packet is modified to include a next hop destination endpoint address. At each endpoint in the sequence, the packet is transmitted, with its modified next hop destination endpoint address, on to the packet routing network. Services are imparted to a received packet by endpoints that receive it in the course of its propagation.

BRIEF DESCRIPTION OF DRAWINGS

Some embodiments are illustrated by way of example and not limitation in the figures of the accompanying drawings in which:

FIGS. 8A-8B are illustrative block diagrams of a portion of the system of FIG. 1 showing an example bus mapping within the first packet routing network (FIG. 8A) and showing an example bus mapping within the second packet routing network (FIG. 8B) in accordance with some embodiments.

FIG. 9 is an illustrative drawing representing an example first information structure stored in a computer readable storage device in accordance with some embodiments.

FIGS. 10A-10B are illustrative flow diagram of a processes to configure the first, second and third packet processing circuits to perform services in accordance with some embodiments.

FIG. 11 is an illustrative drawing representing an example second information structure in accordance with some embodiments.

FIGS. 13A-13F are illustrative drawings that show an illustrative example set of third information structures in accordance with some embodiments.

FIG. 14 is an illustrative drawing representing an example fourth information structure in accordance with some embodiments.

DESCRIPTION OF EMBODIMENTS

Figure 1:
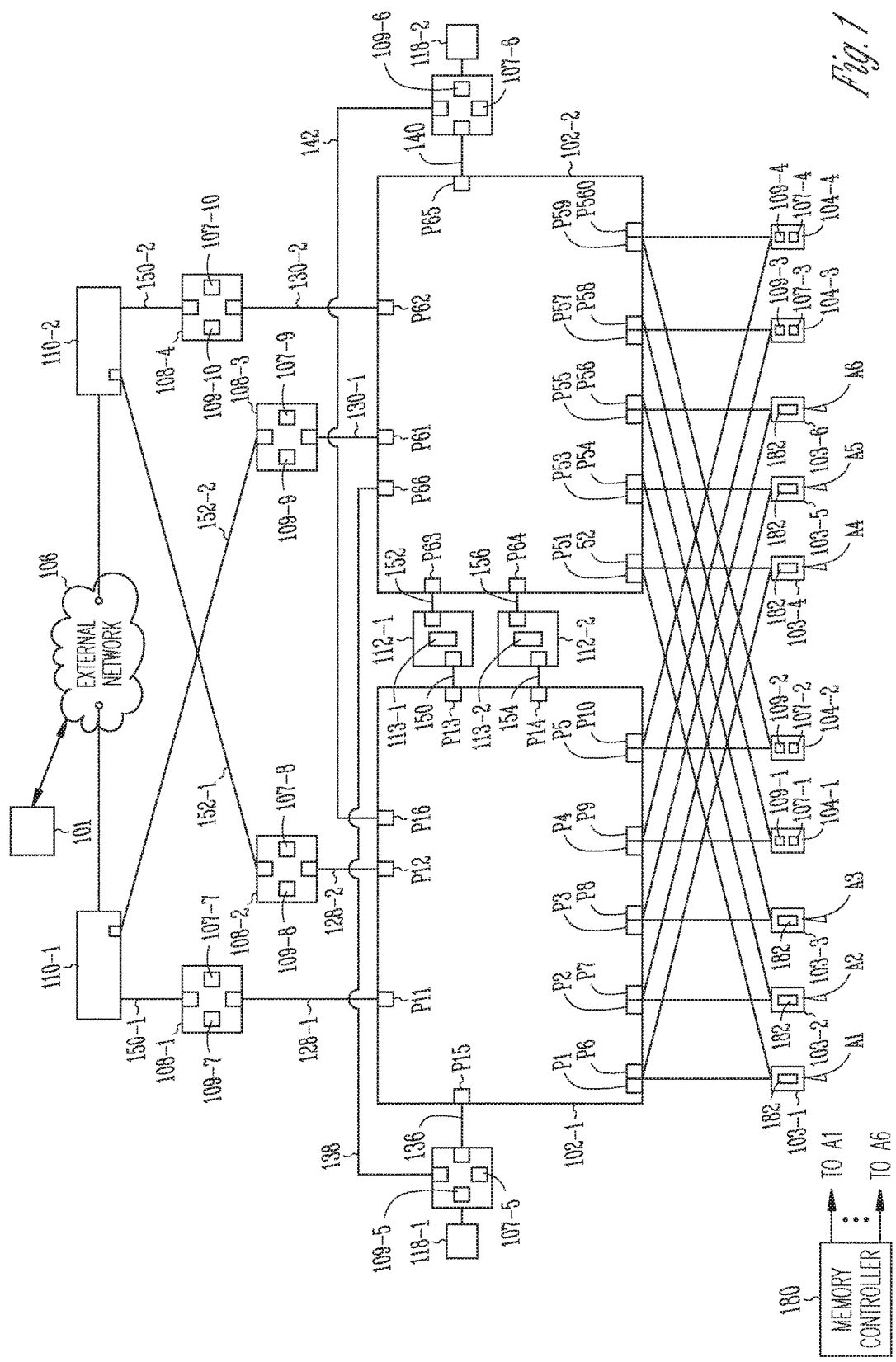
FIG. 1 is an illustrative architecture level block diagram of a storage system in accordance with some embodiments.

The following description is presented to enable any person skilled in the art to create and use a storage system with a dynamically configurable network for delivery of flow based services for information stored in Flash solid state storage devices. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known data structures and processes are shown in block diagram form in order not to obscure the description of the invention with unnecessary detail. Identical reference numerals may be used to represent different views of the same or like items in different drawings. Flow diagrams in drawings referenced below are used to represent processes. In some cases, a computer system is configured to perform these processes. The flow diagrams may include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

System Overview

FIG. 1 is an illustrative architecture level block diagram of a system 100 in accordance with some embodiments. The system 100 includes redundant first and second packet routing networks 102-1, 102-2 that route packets between endpoints so that in each routing network, every endpoint is accessible to every other endpoint. In order to simplify the following description the two routing networks sometimes shall be referred to as "the routing network 102-1, 102-2". Packets are transmitted over one or the other of the two redundant packet routing networks. Each of the routing networks 102-1, 102-2 includes internal circuit paths and routing circuitry that includes mapping circuitry. The mapping circuitry provides mapping information to guide routing of packets, for each endpoint coupled to the network, from that endpoint, over internal circuit paths from one circuit path to the next, to any other endpoint coupled to the network.

The system 100 includes a plurality of Flash solid state (storage) drive (SSD) circuits (hereinafter "Flash circuits" or "Flash") 103-1 to 103-6 that are coupled as endpoints to the network 102-1, 102-2. The system 100 also includes a plurality of first packet processing service-providing circuits 104-1 to 104-4, second packet processing service-providing circuits 116-1, 116-2 and third packet processing service providing circuits 108-1 to 108-4. (hereinafter first, second and third "packet processing circuits") that are coupled as endpoints to the networks. First and second general purpose management processors 112-1, 112-2 are coupled as endpoints to the network 102-1, 102-2. The first and second general purpose management processors include respective first and second non-transitory local memory devices 113-1, 113-2. The processors can be used to enumerate and configure the routing networks 102-1, 1-2-2 to define circuit path mappings of circuit path routes, within the routing networks 102-1, 102-2, between endpoints. The processors also can be used to configure and manage the packet processing circuits to define endpoint mappings of multi-endpoint routes, over the routing networks 102-1, 102-2, between source endpoints and terminal destination endpoints. The system 100 includes redundant processors 112-1, 112-2 and redundant routing networks 102-1, 102-2 to permit recovery from component failures, for example.

Data are stored in the Flash circuits. End-user devices 101 are coupled to the external network 106. The system provides end-user device access to the Flash. More specifically, the third packet processing service providing circuits 108-1 to 108-4 are configured to operate as input/output (I/O) circuits that provide an interface between the external network 106 and the routing networks 102-1, 102-2, which in turn, provides end-user device access to the Flash.

Data are encapsulated in packets transferred over the routing networks 102-1, 102-2 between the Flash circuits and the I/O circuits. More specifically, information transmitted through either one or the other of the routing networks 102-1, 102-2 is encapsulated in packets that include routing information that indicates a source endpoint and a destination endpoint. While en route over one of the routing networks 102-1 or 102-2, between a Flash circuit endpoint and an I/O circuit endpoint, destination endpoint address information in selected packets can be changed dynamically so as to route the packets to one or more additional endpoints. For example, while a packet is en route from an I/O circuit endpoint to a Flash circuit endpoint or while a packet is en route from a Flash circuit endpoint to an I/O circuit endpoint, destination information within the packet can be changed multiple times to route the packet to one or more respective first and/or second packet processing circuits 104-1 to 104-4 and/or 116-1, 116-2. Dynamic packet routing, as used herein, refers to changing a destination of a packet in the course of its traversal of the routing networks 102-1 or 102-2 so that it visits one or more packet processing circuits during its traversal from a source endpoint to a terminal destination endpoint.

A packet processing circuit visited by a packet during its traversal imparts a service to the packet. Multiple services may be imparted to a packet that visits multiple packet processing circuits. Different combinations of services can be imparted to different packets that are routed to different combinations of packet processing circuits. The packet processing circuits can be constructed to provide services faster than the same services can be provided, typically, using a general purpose management processor.

Routing networks 102-1, 102-2, in accordance with some embodiments, transmit data at clock speed/data transfer rates that are high enough so that delay in transmitting a packet over one of the routing networks 102-1, 102-2 so as to visit multiple packet processing circuits is not significant relative to typical access delay or latency of flash storage devices. The high speed operation of the routing networks in combination with the high speed operation of the packet processing circuit endpoints enables delivery of services to a packet while en route between an I/O circuit endpoint and a Flash endpoint at speeds that are compatible with Flash circuit access rates.

Packet Processing Circuits

Figure 2:
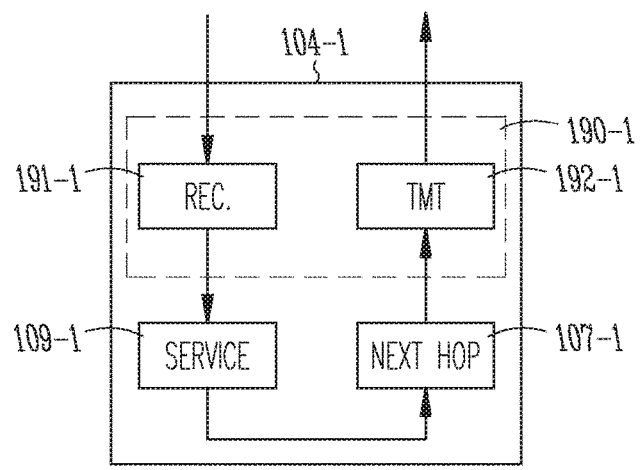
FIG. 2 is an illustrative block diagram of a representative first packet processing circuit of the system of the system of FIG. 1 in accordance with some embodiments.
Figure 3:
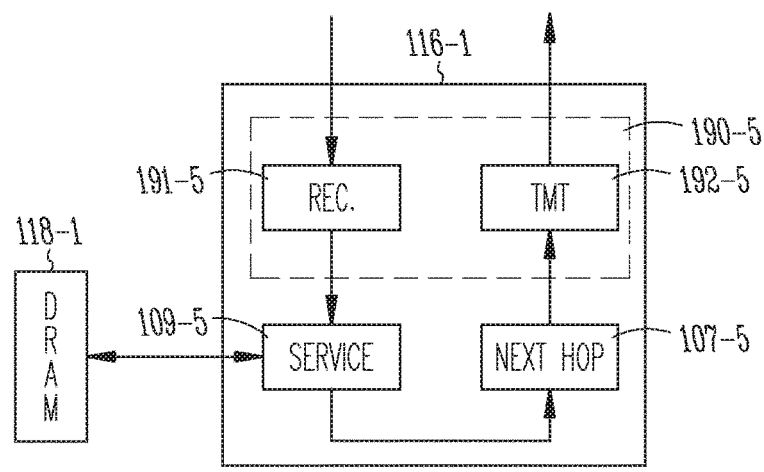
FIG. 3 is an illustrative block diagram of a representative second (cache) packet processing circuit of the system of FIG. 1 in accordance with some embodiments.
Figure 4:
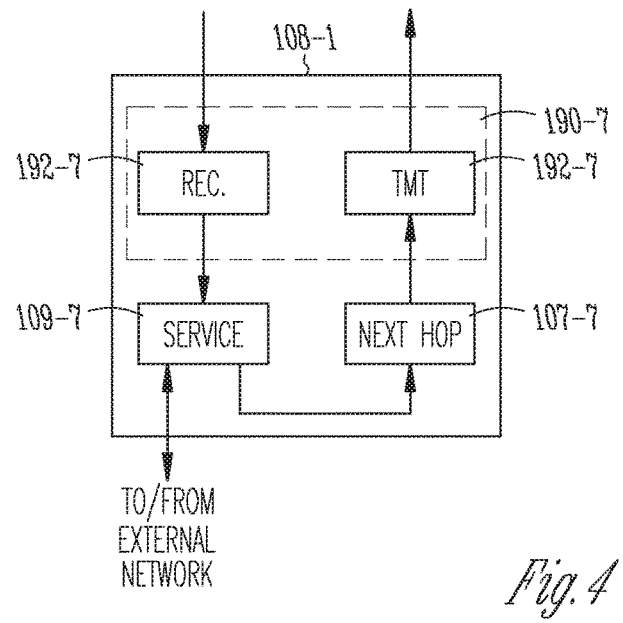
FIG. 4 is an illustrative block diagram of a representative third (I/O) packet processing circuit of the system of FIG. 1 in accordance with some embodiments.

FIGS. 2-4 are illustrative block diagrams showing a representative first packet processing circuit 104-1, a representative second packet processing circuit 116-1 and a representative third packet processing circuit 108-1 in accordance with some embodiments. It will be understood that the description of the representative first packet processing circuit 104-1 is representative of the other first packet processing circuits 104-2 to 104-4; that the description of the representative second packet processing circuit 116-1 is representative of the other second packet processing circuit 116-2; and that the description of the representative third I/O packet processing circuit 108-1 is representative of the other third I/O packet processing circuits 108-2 to 108-4.

The representative first, second and third packet processing circuits, respectively, include receiver circuits 191-1, 191-5, 191-7 compliant with a routing protocol used on the networks 102-1, 102-2 that receive packets that are selectively routed to them. The respective first, second and third packet processing circuits include corresponding packet-content dependent routing circuits 107-1, 107-5, 107-7 that modify endpoint destination address information included within a packet as a function of content within the packets that they receive. In some embodiments, the packet-content dependent routing circuits include non-transitory computer readable storage devices. More particularly, in some embodiments, the packet-content dependent routing circuits can include content addressable memory (CAM) circuitry. The respective first, second and third packet processing circuits also include corresponding service-providing circuits 109-1, 109-5, 109-7 that impart services directed to the content within the packets that they receive. In accordance with some embodiments, some of the services are directed to modification of packet payload (PLD) content. More specifically, the representative first and third service-providing circuits 109-1 and 109-7 include logic circuits configured to impart services that modify packet payload content. The representative second service-providing circuit 109-5 imparts cache storage services to packet payload. The processing circuits include transmit circuits 192-1, 192-5 192-7 compliant with the routing protocol used on the routing networks 102-1, 102-2 that send the packets that they receive, which may include the modified payload content, if any, and modified endpoint destination address information, over the routing network 102-1, 102-2 to a next hop endpoint destination addresses.

In accordance with some embodiments, the representative first and second packet processing circuits 104-1 and 116-1 include respective field programmable gate array (FPGA) circuitry that is configurable to implement the respective packet-content dependent routing circuits and the respective service-providing circuits. FPGA circuitry often can impart services with less latency delay, and therefore, faster than a typical general purpose management processor, for example, since the programmable logic can be programmed in advance to dedicate specific hardware circuitry to provide the services. Programmable hardware logic such as FPGA circuitry often can perform operations faster than a general purpose processor, for example, which often use software interrupts often to transition between different operations.

Alternatively, in accordance with some embodiments, one or more of the packet processing circuits can include a special purpose processor, an application specific integrated circuit (ASIC), or an array of processors configured to run software to perform a given service. The representative third packet processing circuit 108-1 also can include an FPGA, or alternatively, an ASIC or a special purpose "NIC" (network interface circuit) processor configured to transform packets to suitable formats as they pass between the external network 106 and the routing networks 102-1, 102-2.

The packet-content dependent routing circuits 107-1, 107-5 and 107-7 within the representative first, second and third packet processing circuits 104-1, 116-1 and 108-1 are configured to coordinate routing of different selected packets among different sets of one or more packet processing circuits while the selected packets are en route between respective Flash circuits and respective I/O circuits. More specifically, different endpoint destination address modifications are imparted to different selected packets so as to route the different combinations of packets among different packet processing circuits so that the representative different ones of the service-providing circuits 109-1, 109-5, and 109-7 may provide different combinations of services to the different selected packets. The endpoint destination addresses within some packets are modified multiple times so as to route the packets to multiple packet processing circuits while en route between the respective Flash circuits and respective I/O circuits, and thereby to have more than one service imparted to their payloads content while en route.

Referring to FIG. 2, there is shown an illustrative block level drawing of the representative first packet processing circuit 104-1 in accordance with some embodiments. Transceiver interface circuitry 190-1 provides an interface with the networks 102-1, 102-2. The transceiver interface includes receiver circuitry 191-1 and transmitter circuitry 192-1. The service-providing circuit 109-1 is coupled to receive a packet received by the receiver circuitry 191-1. The service-providing circuit 109-1 is configured to impart one or more services to the received packet. In some embodiments, the services, which are explained more fully below, can include one or more of encryption/decryption, duplication/de-duplication and/or compression/de-compression, for example. It will be understood that a decryption service is a reverse of a an encryption service; that a de-duplication service is a reverse of a an duplication service; and that a de-compression service is a reverse of a an compression service, for example. Also, it will be appreciated that imparting the services modifies payload content of a received packet. For example, a packet that has a compression service imparted to it has its payload content compressed, and conversely, for example, a packet that has a decompression service imparted to it has its payload content decompressed. The packet-content dependent routing circuit 107-1 modifies endpoint destination address within the received packet to indicate a next hop endpoint destination on one of the networks 102-1, 102-2. The transmitter circuitry 192-1 transmits the packet with modifications, if any have been made, onto one of the networks 102-1, 102-2 for delivery to the next hop endpoint destination endpoint.

Referring again to FIG. 1, it will be appreciated that the system 100 includes multiple first packet processing circuit 104-1 to 104-4, each including one or more service-providing circuits that may impart services to a given packet resulting in the packet having multiple modifications imparted to it. For example, a packet that is routed both to a packet processing circuit that has a first service-providing circuit configured to perform compression and then to a different packet processing circuit that has a first service-providing circuit configured to perform encryption will have its content both compressed and encrypted. The packet routing and imparting of services can be applied in both directions: to packets that are en route from an I/O circuit to Flash, and conversely, to packets that are en route from Flash to an I/O circuit. Thus, it will be appreciated that packets can be routed, for example, so that in one direction (e.g., from I/O circuit to Flash) one set of services can be applied (e.g., compression and encryption) and in the opposite direction (e.g., from Flash to I/O circuit), a complementary set of services can be applied (e.g., decompression and decryption). Moreover, although the first packet processing circuit 104-1 of FIG. 2 is shown and described providing a single service, alternatively it can be configured to provide multiple services such as both compression and decompression, for example.

Referring to the illustrative drawing of FIG. 3, there is shown an illustrative block level drawing of a representative second "cache" packet processing circuit 116-1 in accordance with some embodiments. Transceiver interface circuitry 190-5 provides an interface with the networks 102-1, 102-2. The transceiver interface includes receiver circuitry 191-5 and transmitter circuitry 192-5. The service providing circuit 109-5 is coupled to receive a packet received by the receiver circuitry 191-5. The second service-providing circuit 109-5 is configured to provide a cache storage service. The second service providing circuit 109-5 is operably coupled to a DRAM circuit 118-1 that can Read and Write data with lower latency than experienced for data access to/from Flash, for example. The packet-content dependent routing circuit 107-5, when necessary, modifies destination address within the received packet to indicate a next hop endpoint destination on one of the networks 102-1, 102-2.

It will be appreciated that the "cache" packet processing circuit 116-1 and its DRAM 118-1 provide a cache storage service that can obviate the need for a packet to traverse the networks 102-1, 102-2 to Flash to access data. Moreover, it will be appreciated that a packet that is routed to the representative second "cache" packet processing circuit 116-1 also may be routed to one or more of the first packet processing circuits 104-1 to 104-4 either before or after or both before and after arriving at the "cache" packet processing circuit 116-1. Alternatively, a packet that is routed to the representative second "cache" packet processing circuit 116-1 may not be routed to any first packet processing circuit.

Referring to the illustrative drawing of FIG. 4, there is shown an illustrative block level drawing of the representative third "I/O" packet processing circuit 108-1 in accordance with some embodiments. Transceiver interface circuitry 190-7 provides an interface with the routing networks 102-1, 102-2. The transceiver interface includes receiver circuitry 191-7 and transmitter circuitry 192-7. The third service-providing circuit 109-7 is configured to provide high-speed connections between the external network 106, via the respective first and second network switches 110-1, 110-2, and the routing networks 102-1, 102-2. More particularly, the third service-providing circuit 109-7 provides protocol conversion, including packet format conversion, between a first protocol and a first packet format used on the external network 106 and a second protocol and a second packet format used on the networks 102-1, 102-2. Packet-content dependent routing circuit 107-7 determines endpoint destination address information to be included in packets received from the external network 106 that are to be transmitted over one of the routing networks 102-1, 102-2.

The transmitter circuitry 192-7 transmits packets, which have been received from the external network 106 and which have been transformed using the service-providing circuit 109-7, onto one of the routing networks 102-1, 102-2 for delivery to a next hop endpoint destination endpoint.

The first and second network switches 110-1, 110-2 are compatible with the first network protocol used by the external network 106, which in some embodiments includes Ethernet, InfiniBand, Fibre Channel, or serial attached SCSI (SAS), for example. The first and second routing networks 102-1, 102-2 use the second network protocol, which in some embodiments, includes a PCIe protocol.

Flash Circuits

Figure 5:
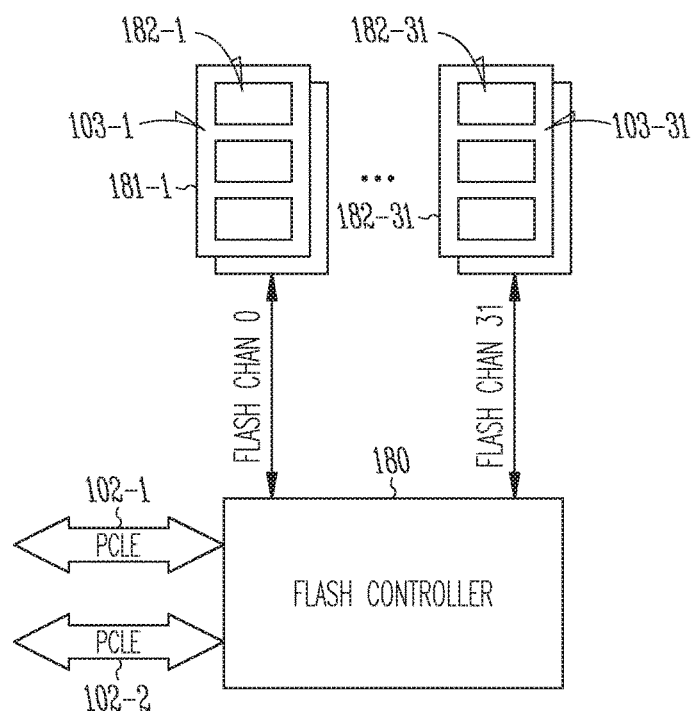
FIG. 5 is an illustrative schematic diagram showing a plurality of Flash storage modules coupled to a Flash memory controller coupled to first and second packet networks of the system of FIG. 1 in accordance with some embodiments.

FIG. 5 is an illustrative schematic diagram showing a plurality of Flash storage circuits 103-1 to 103-31 coupled to a Flash memory controller 180, which in turn, is coupled to the first and second packet networks 102-1, 102-2. It will be appreciated that for simplification of explanation, FIG. 1 shows the system 100 with only a few representative Flash circuits 103-1 to 103-6. However, in some embodiments, a system 100 can include a large number of Flash endpoints, such as 50-100 of them, for example. Moreover, as shown in FIG. 5, in some embodiments each Flash circuit endpoint 103-1 to 103-31 includes a printed circuit board (PCB) 181-1 to 181-31 having multiple individual Flash integrated circuits (ICs) 182-1 to 182-3 arranged on opposite surfaces thereof. A memory controller 180 is coupled to the routing networks 102-1, 102-2 and manages the flow of data going to and from the Flash ICs on the Flash storage module of the endpoints.

Form Factor Modules

The Flash storage circuit circuits 103-1 to 103-31 share the same form factor, and in some embodiments, the Flash circuit modules' from factor is compliant with a dual inline memory module (DIMM) format. In some embodiments, one or more of the respective first, second and third packet processing circuits 104-1 to 104-4 and 116-1, 116-2 and 108-1 to 108-4 are disposed on respective circuit printed circuit board modules that have a form factor matching that of the Flash circuit modules. Thus, Flash circuit modules and packet processing circuit modules can be interchangeably inserted into slots (not shown) in a backplane (not shown). It will be appreciated that although only a few illustrative packet processing circuits are shown in FIG. 1, a larger much number can be employed depending upon services to be provided.

Services and Policies

In accordance with some embodiments, the services imparted by the packet processing circuits may alter packet payload content, and may include one or more of encryption/decryption, duplication/de-duplication, compression/decompression, RAID processing, replication, snapshot and/or NICs (network interface cards) for packet input and output, for example.

An encryption service can be used, for example, to encode packet information in such a way that only authorized parties can read it. In a typical encryption scheme, for example, information, referred to as plaintext, is encrypted using an encryption algorithm, turning it into an unreadable ciphertext. A decryption service provides the reverse of an encryption service. Moreover different styles of encryption and decryption may be provided, and each different style may constitute a different service.

A de-duplication service also can be used, for example, to reduce physical space occupied by a data block within a packet. Raw data sometimes contains entire repeated blocks. A common example is an email database in which emails to several individuals contain identical attachments. Some de-duplication services keep a lookup table with en entry for each data block seen so far, and when it detects duplicate blocks it replaces the duplicate data with a pointer to the data of the first block seen. A duplication service provides the reverse of a de-duplication service.

A compression service can be used, for example, to reduce the physical storage space occupied by a data block within a packet. For example, some compression processes recognize patterns within the data and replace raw data with more compact patterns. For example, in run-length encoding, a string of twenty "a" characters could be replaced by the string "20a" which occupies only three characters. A de-compression service provides the reverse of a compression service. In some embodiments, services imparted by the packet processing circuits do not alter packet payload content, and may include may include cache storage or general parsing services, for example. For example parsing services may involve setting up a parsing table, paring packets using the parsing table, and extracting information fields from packets and acting upon the extracted information. Conversely, services may include the reverse of parsing in which packet generation tables are set up, and packets are generated from input data fields combined with instructions in the packet generation tables. Services may include counting services in which a programmable logic resource circuit is informed of events in the system, such as packets read/written or bad packets, or packet latency times, and using these events it updates internal counters, and later responds to queries by delivering the counters. Moreover different styles of compression and de-compression may be provided, and each different style may constitute a different service.

A RAID service can facilitate redundant grouping of Flash storage circuits to improve chances of data recovery in failure scenarios. More particularly, a RAID service ordinarily involves enhancing data protection by mirroring, striping and adding parity to data to in storage drives in a storage array. Moreover different styles of RAID may be provided and each different style may constitute a different service.

A replication service can be used to broadcast a packet to multiple storage sites for high availability, for example. A packet may be received that specifies a write of data to a particular LUN, for example. A replication service can recognize that the data should be written to multiple LUNs rather than only to the specified LUN. The replication service can create multiple different packets, each containing header information to designate a write of the data to a different LUN located at a different storage site (not shown). The replication service can cause the multiple different packets to be broadcast to geographically dispersed storage sites so as to provide backup storage of the data and/or so as to store the data at a site that is physically closer to where a user likely to use it is located.

A snapshot service can be used to capture additional writes to a LUN that occur while a LUN is being backed-up, for example. The data in a LUN may be backed up periodically to a different storage location, for example. During the backup operation, new data may be written to the LUN. A snapshot service creates a "snapshot", i.e. a copy of the LUN, at the moment that the backup operation begins, and during the course of the backup operation new write data is written to the snapshot rather than to the LUN that is being backed up. Upon completion of the backup, blocks, e.g., Logical Block Addresses, within the snapshot that are written to during the snapshot are copied to the backup storage and also to the LUN that has been backed up. Thus, backup can proceed without loss of write data received during the backup.

As used herein, a "policy" refers to a set of one or more services associated with selection criteria such as a storage location. In some embodiments, a service refers to a sequence of services, in other words to a set of services that imparted in a prescribed order. A packet that contains information that indicates that it meets policy criteria is subject to the set of services associated with the policy. For example, a set of services associated with a Read request from a prescribed memory location might include compression of the read data. In this example, the criteria for the policy are that the packet specifies a Read request and that the Read request specifies the prescribed storage location and the example policy is to compress the data that is read in response to the Read request.

Redundancy

Referring again to FIG. 1, the routing networks 102-1, 102-2 provide redundant paths between the Flash circuits 103-1 to 103-6 and the external network 106 to ensure continuity of operation in the event of failure of the networks. The first packet routing network 102-1 is operably coupled to the Flash storage circuit endpoints 103-1 to 103-6 via its ports P1-P6. The second packet routing network A102-2 is operably coupled to the same Flash storage circuit endpoints 103-1 to 103-6 via its ports P51-P56. For example, Flash storage circuit endpoint 103-1 is operably coupled via circuit path 120-1 to port P1 of the first packet routing network 102-1 and is operably coupled via circuit path 122-1 to port P52 of the second packet routing network 102-2. Also, for example, Flash storage circuit endpoint 103-4 is operably coupled via circuit path 124-1 to port P2 of the first packet routing network 102-1 and is operably coupled via circuit path 126-1 to port P51 of the second packet routing network 102-2.

The first packet routing network 102-1 is operably coupled to the first packet processing circuit endpoints 104-1 to 104-4 via its ports P7-P10. The second packet routing network A102-2 is operably coupled to the same first packet processing circuit endpoints 104-1 to 104-4 via its ports P57-P60. For example, the first packet processing circuit endpoint 104-1 is operably coupled via circuit path 124-4 to port P8 of the first packet routing network 102-1 and is operably coupled via circuit path 126-4 to port P57 of the second packet routing network 102-2. Also, for example, the first packet processing circuit endpoint 104-4 is operably coupled via circuit path 124-5 to port P10 of the first packet routing network 102-1 and is operably coupled via circuit path 126-5 to port P60 of the second packet routing network 102-2.

The first packet routing network 102-1 is operably coupled to the third I/O packet processing circuit endpoints 108-1 and 108-2 via its ports P11-P12. The second packet routing network 102-2 is operably coupled to the third I/O packet processing circuit endpoints 108-3 and 108-4 via its ports P61-P62. For example, third I/O packet processing circuit endpoint 108-1 is operably coupled via circuit path 128-1 to port P11 of the first packet routing network 102-1 and the third I/O packet processing circuit endpoint 108-2 is operably coupled via circuit path 128-2 to port P12 of the first packet routing network 102-1. Also, for example, third I/O packet processing circuit endpoint 108-3 is operably coupled via circuit path 130-1 to port P61 of the second packet routing network 102-2 and the third I/O packet processing circuit endpoint 108-4 is operably coupled via circuit path 130-2 to port P62 of the second packet routing network 102-2. Moreover, the third I/O packet processing circuit endpoint 108-1 is coupled via circuit path 150-1 to the first network switch 110-1, and the third I/O packet processing circuit endpoint 108-2 is coupled via circuit path 152-1 to the second network switch 110-2. Similarly, the third I/O packet processing circuit endpoint 108-3 is coupled via circuit path 150-2 to the first network switch 110-1, and the third I/O packet processing circuit endpoint 108-4 is coupled via circuit path 152-2 to the second network switch 110-2.

A second packet processing circuit endpoint 116-1 is operably coupled to first DRAM circuit 118-1. A second packet processing circuit endpoint 116-2 is operably coupled to second DRAM circuit 118-2. The second packet processing circuit 116-1 endpoint is operably coupled via circuit path 136 to port P15 of the first packet routing network 102-1 and is operably coupled via circuit path 138 to port P66 of the second packet routing network 102-2. The second packet processing 116-2 endpoint is operably coupled via circuit path 140 to port P65 of the first packet routing network 102-1 and is operably coupled via circuit path 142 to port P16 of the second packet routing network 102-2. Thus, each of the first and second packet routing networks 102-1, 102-2 can redundantly operably couple either of the two second packet processing circuit endpoints 116-1, 116-2 with any of the Flash circuit endpoints 103-1 to 103-6, with any of the four first packet processing circuits 104-1 to 104-4 and with any of the four third I/O packet processing circuit endpoints 108-1 to 108-4.

First management processor endpoint 112-1 is operably coupled via circuit path 150 to port P13 of the first packet routing network 102-1 and is operably coupled via circuit path 152 to port P63 of the second packet routing network 102-2. Second management processor endpoint 112-2 is operably coupled via circuit path 154 to port P14 of the first packet routing network 102-1 and is operably coupled via circuit path 156 to port P64 of the second packet routing network 102-2. Thus, each of the first and second packet routing networks 102-1, 102-2 can redundantly operably couple either of the first and second management processors with any of the Flash circuits 103-1 to 103-6, with any of the four first packet processing circuits 104-1 to 104-4, with any of the four third I/O packet processing circuits 108-1 to 108-4 and with either of the two second packet processing circuits 116-1, 116-2.

Packet Routing Network "Fabric"

Figure 6:
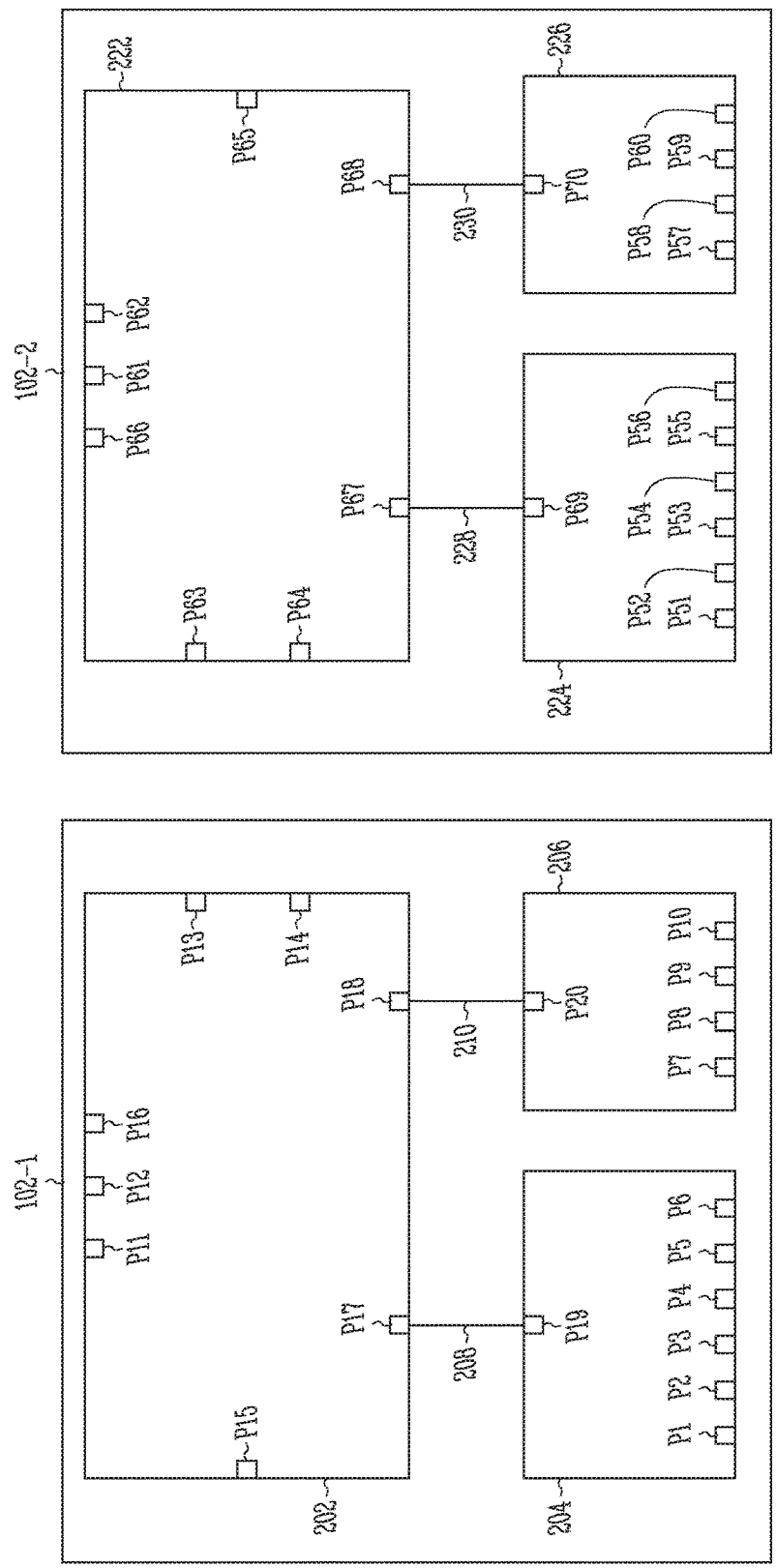
FIG. 6 is an illustrative block diagram showing certain internal details of first and second packet routing networks of the system of FIG. 1 in accordance with some embodiments.

FIG. 6 is an illustrative diagram showing certain internal details of the first and second packet routing networks 102-1, 102-2 of FIG. 1 in accordance with some embodiments. The first packet routing network 102-1 includes first, second and third switch devices 202, 204, 206, respectively. The second packet routing network 102-2 includes fourth, fifth and sixth switch devices 222, 224, 226, respectively. The first switch 202 includes ports P11-P18. The second switch 204 includes ports P1-P6 and P19. The third switch 206 includes ports P7-P10 and P20. The fourth switch 222 includes ports P61-P68. The fifth switch 224 includes ports P51-P54 and P69. The sixth switch 226 includes ports P55-P60 and P70.

Circuit path 208 physically connects port P17 of the first switch 202 with port P19 of the second switch 204. Circuit path 210 connects port P18 of the first switch with port P20 of the third switch 206. Circuit path 228 physically connects port P67 of the fourth switch 222 with port P69 of the fifth switch 224. Circuit path 230 connects port P68 of the fourth switch with port P70 of the sixth switch 226. It will be appreciated that ports P17-P20 and circuit paths 208, 210 are internal to the first packet routing network 102-1, and that ports P67-P70 and circuit paths 228, 230 are internal to the second packet routing network 102-2.

The switches, circuit paths and ports of the packet routing networks 102-1, 102-2 are sometimes referred to collectively as the network "fabric".

PCIe Compliant Packet Routing Networks

In accordance with some embodiments, the network "fabric" of the first and second packet routing networks 102-1, 102-2 is compliant with the PCI Express Base Specification (hereinafter "PCIe") released by the PCISIG (PCI Special Interest Group). See, PCI Express Technology, Comprehensive Guide to Generations 1.x, 2.x and 3.0, by M. Jackson and R. Budruk, 2102, Mindshare, Inc.

Links and Lanes

PCIe specifies point-to-point bidirectional serial communication paths between endpoints over switches and connection lines. A PCIe network includes serial connection lines commonly referred to as 'links' that are capable of sending and receiving information at the same time. According to PCIe, a link can include one or more serial transmit and serial receive connection pairs. Each individual pair is referred to as a 'lane'. A link can be made up of multiple lanes. Each lane uses differential signaling, sending both positive and negative versions of the same signal. Advantages of differential signaling include improved noise immunity and reduced signal voltage.

Endpoints and Switches

In a PCIe compliant packet routing network, internal routing switch devices route packets over point-to-point serial connections between endpoint devices coupled to the network. The endpoint devices and internal routing switches and include "core" logic that implements one or more functions. A function may include, for example, a service provided by a packet processing circuit, packet-content dependent routing provided by a packet processing circuit, or an internal routing service provided by an internal routing switch, for example. A device that is a component of a typical PCIe compliant network, can have multiple functions, up to eight in some embodiments, each implementing its own configuration space. A device that acts as a switch includes packet routing logic to selectively transmit packets between switch ports that provide access to internal circuit paths. In the embodiment of FIG. 1, implemented using PCIe, the Flash storage devices 103-1 to 103-6, the first packet processing circuits 104-1 to 104-4, second packet processing circuits 116-1, 116-2 and the third I/O packet processing circuits 108-1-108-4 and the management processors 112-1, 112-2 act as endpoints, and the switches 202-206 and 222-226 act as switch devices. As explained below, switches 202-206 and 222-226 include internal routing switches.

In accordance with some PCIe embodiments, the management processors 112-1, 112-2 are configured so that each can manage the configuring of the switch devices within the first and second packet switching networks 102-1, 102-2 and the configuring of the endpoints for transmitting and receiving information over the network fabric. In accordance with some embodiments, the PCIe specification specifies use of a root complex to configure the routing networks 102-1, 102-2. A root complex implements interface circuitry (e.g., processor interface, DRAM interface) between a management processor and the rest of the network topology that includes switches, bridges and communications paths. The term "root" is used to indicate that the root complex is disposed at a root of an inverted tree topology that is characteristic of a hierarchical PCIe compliant network. Persons skilled in the art will appreciate that in a typical PCIe compliant circuit, a packet directed between a source endpoint and a destination endpoint generally proceed from the source endpoint upward within the tree topology toward the root node and branches at a nearest shared parent node, i.e. at a routing switch, having packet's destination endpoint as a branch. It will be understood that the routing networks 102-1, 102-2 can be implemented so as to allow communication between endpoints without requiring packets to actually flow the through a root node.

Information is transmitted in packets between endpoints over the routing networks 102-1, 102-2, which include internal routing switches. In operation, a routing switch evaluates the internal contents of a given packet received on a switch port that acts as an ingress port to obtain address or other routing information used to determine which circuit path the given packet should take, and therefore, which switch port should act as an egress port to output the packet on. It will be appreciated that ports are bidirectional and each port can act as both an ingress port and as an egress port. The routing switches thereby provide fanout or aggregation capability that allows more endpoint devices to be coupled to a root complex.

Figure 7:
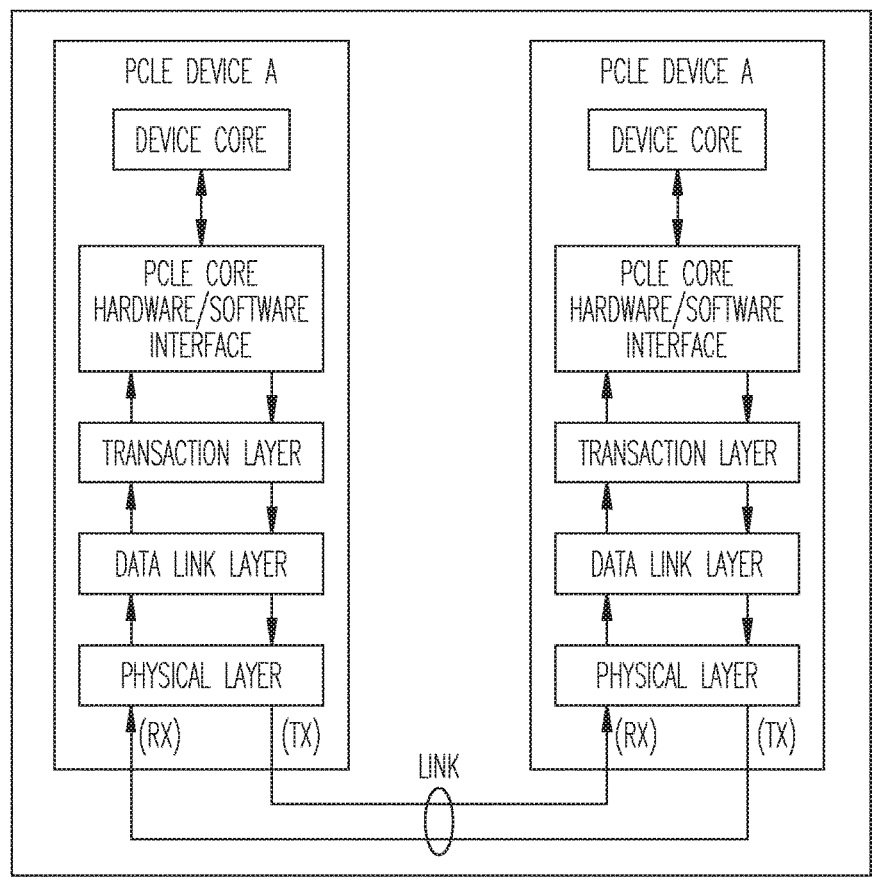
FIG. 7 is a generalized illustrative block level drawing representing layered network architecture of the system of FIG. 1, encompassing a packet routing network and the endpoints coupled to it, in accordance with some embodiments.

FIG. 7 is a generalized illustrative block level drawing representing layered network architecture of the system of FIG. 1, encompassing a packet routing network and the endpoints coupled to it, in accordance with some embodiments. Device A and device B represent endpoints that have different core functionalities, for example. The illustrated Link comprises a circuit path through packet routing network, 102-1, or 102-2 between endpoint device A and endpoint device B. A transaction layer is responsible for transaction layer packet (TLP) creation on the transmit side and transaction layer decoding on the receive side. The transaction layer is responsible for quality of service functionality, flow control functionality and transaction ordering functionality. A data link layer is responsible for data link layer packet (DLLP) creation and decoding. The data link layer is responsible for link error detection and correction and implements a function that is referred to as an Ack/Nak protocol. A sending transmitter device holds a transmitted packet in a replay buffer until it receives an Ack signal from the receiver device confirming receipt, whereupon the sender flushes the packet from its replay buffer. In response to the sender receiving a Nak signal from the receiver, indicating an error, the sender resends the packet. On the transmit side, a physical layer is responsible for ordered-set packet creation and to provide serial output differentially clocked information onto the communication lanes. On the receive side, physical layer processing includes serially receiving the differentially encoded bits and converting to a digital format.

Transaction

A transaction is defined as the combination of a request packet that delivers a command to a targeted device, together with any completion packets that the target sends back in reply. A requesting endpoint is sometimes referred to as a "requester" and an endpoint that is the target of the request is sometimes referred to as a "completer". A requester sends requests over the network fabric to one or more completers, and routing switches within the packet routing network route the requests and responses over the routing switch fabric between requesters and completers. In accordance with a split transaction protocol, a target endpoint can receive multiple requests and respond to each request with separate completions whenever it is ready to do so. It will be appreciated that an endpoint can act as both a requester and a completer. Categories of transactions include: memory, JO, configuration and messages, for example. A transaction originates at a transaction layer of a requester and ends at a transaction layer of a receiver. The data link layer and physical layer add parts to the packet as it moves through those layers of the requester and then verify at the receiver that those parts were transmitted correctly over the link.

Enumeration and Static Configuration of Routing Networks

The management processors 112-1, 112-2 manage the enumeration and configuration of the routing networks 102-1, 102-2. During enumeration in accordance with some embodiments, each bus, also referred to herein as a "circuit path", in the network fabric is assigned a bus identifier. The enumeration process identifies buses (i.e. circuit paths) by searching for routing circuits in the network. An internal routing circuit in accordance with some embodiments acts as an internal bridge that provides an interface between two buses. Mapping information is loaded into the configuration registers associated with the internal routing circuits so that they can that act as static (i.e. fixed) mapping circuitry.

More particularly, during the enumeration process, the network topology of a PCIe compliant system is discovered, and bus numbers are assigned to serve as bus identifiers within the switch fabric. In a PCIe system, serial buses (circuit paths) are implemented as links and lanes. A switch in accordance with some embodiments may contain a plurality of bridge circuits used to create additional circuit paths that additional endpoint devices can be connected to. In essence, a bridge circuit, in accordance with some embodiments, connects two or more circuit paths (buses). In a PCIe network topology, each endpoint device that is connected to a PCIe bus is assigned a device number. Due to the point-to-point nature of PCIe, each PCIe bus can be coupled to only one endpoint, typically designated as device 0 on that bus. A legacy PCI bus can be coupled to multiple endpoints, however, and a PCIe bus can provide a connection to a legacy PCI bus in accordance with some embodiments. As explained above, each device can have multiple functions associated with it. In general, an endpoint device includes a unique vendor ID registration number for each device function. Examples of functions include hard drive interfaces, Ethernet controllers, display controllers, USB controllers, etc. By identifying all combinations of bus, device and function identifiers within a system, the enumeration process determines what buses (B), endpoint devices (D) and functions (F) are present. The location of each function within the system topology can be identified in terms of its corresponding (B, D, F) identifiers.

During the configuration of the packet routing networks, data link layer connectivity is defined among internal routing. More specifically, static bus-to-bus mapping information is recorded within bus configuration registers of the root complex and within bus configuration registers of the internal routing circuits within the routing network so as to define routes between endpoints. In a PCIe compliant network, each endpoint is connected to a single bus, and bus-to-bus (circuit path-to-circuit path) connectivity information defines static routes between endpoints. In operation, internal routing circuits selectively couple two buses in response to arrival of a packet that matches with contents of its mapping circuitry. In accordance with some embodiments, an internal routing circuit, such as a bridge, can provide coupling between buses supporting different protocols such as PCIe and PCI, for example.

Bus connectivity information associated with a given switch port or root complex port is indicative of a range of buses that are accessible through the port. For example, a packet that is transmitted over the network fabric and that is targeted to a particular endpoint includes information that indicates the bus that the target endpoint is connected to. Ordinarily, a packet traverses one or more internal routing circuits en route to a target endpoint. In traversing a switch, a packet enters the switch through one port and exits through another port. In response to a packet's arrival at a routing circuit's port, the routing circuit accesses destination information included within the packet (e.g., a bus identifier associated with a destination endpoint) and uses the bus connectivity information stored in its bus configuration registers to determine, based at least in part upon the bus identifier, the port on which to output the packet so that it can continue its traversal to its destination endpoint.

Mappings of Static Point-to-Point Network Routing Configuration

Figure 8A:
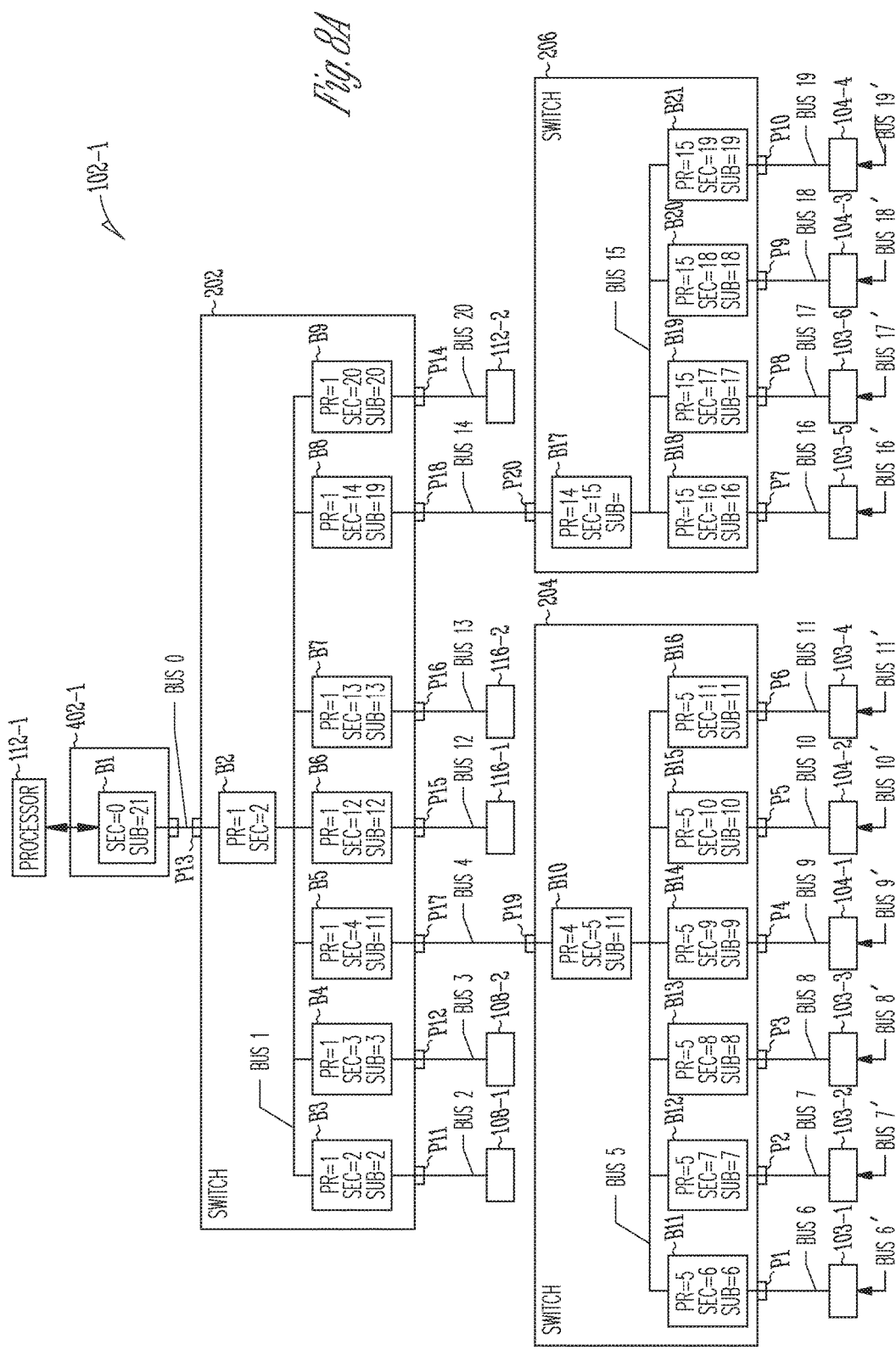

FIGS. 8A-8B are illustrative drawings of a portion of the system 100 of FIG. 1 showing an example static bus-to-bus connectivity mapping within the first packet routing network (FIG. 8A) and the second packet routing network (FIG. 8B) in accordance with some embodiments. FIG. 8A shows an illustrative example bus-to-bus connectivity mapping for the first packet routing network 102-1, which is implemented using a first PCIe compliant switch hierarchy. FIG. 8B shows an illustrative example bus-to-bus connectivity mapping for the second packet routing network 102-2, which is implemented using a second PCIe compliant switch hierarchy.

Referring to FIG. 8A, a first root complex 402-1 couples the first management processor 112-1 and switch 202 in a first switch layer. The root complex 402-1 and the switches 202-206 include ports, which act as bi-directional input/output interfaces. In a PCIe compliant network, each port is associated with an internal routing circuit that provides an interface between two buses each comprising one or more PCIe links. Ports and their associated routing circuits are associated with mappings that are defined during the packet routing network enumeration and configuration process. The mappings indicate bus-to-bus connectivity. In particular, each mapping indicates the buses, and therefore, the endpoints that are accessible through an associated port. In some embodiments in which the routing circuit 102-1 is PCIe compliant, the internal routing circuits are switches include bus registers that store mapping information. The registers store information that indicates what buses are accessible via a routing circuit's associated port. In operation, in response to an arrival of a packet at a routing circuit, wherein the packet includes a header with an endpoint destination address that the routing circuit's mapping information indicates is accessible via its port, the routing circuit passes the packet through to a bus associated with its port. Conversely, in response to an arrival of a packet at a routing circuit, wherein the packet has a header with an endpoint destination address that the bridge's mapping information does not indicate is accessible via its port, the routing circuit does not pass the packet to through to a bus associated with its port. Collectively, the port mappings define a point-to-point connectivity topology for point-to-point communications via multiple buses (i.e. via multiple circuit paths) between endpoints in which packets traverse one or more routing circuits while transiting between the endpoints of the network.

Still referring to FIG. 8A, the first root complex 402-1 includes routing circuit B1, which is a bridge circuit in some embodiments, which provides an interface between the first management processor 112-1 and bus 0. First switch 202 includes internal routing circuits B2-B9. Routing circuit B2 provides an interface between a port interface P13 with bus 0 and bus 1. Routing circuit B3 provides an interface between bus 1 and port P11, which is coupled to the bus 2 circuit path which is communicatively coupled to the first I/O circuit 108-1. Routing circuit B4 provides an interface between bus 1 and the second I/O circuit 108-2 via port P12 and bus 3. Routing circuit B5 provides an interface between bus 1 and the second switch 204 via ports P17, P19 and bus 4. Routing circuit B6 provides an interface between bus 1 and the first logic circuit 116-1 via port P15 and bus 12. Routing circuit B7 provides an interface between bus 1 and the second logic circuit 116-2 via port P16 and bus 13. Routing circuit B8 provides an interface between bus 1 and the third switch 206 via ports P18, P20 and bus 14. Routing circuit B9 provides an interface between bus 1 and the second management processor 112-2 via port P14 and bus 20.

Second switch 204 includes internal routing circuits B10-B16. Routing circuit B10 provides an interface between bus 4 and bus 5 via port interface P19. Routing circuits B11-B13 and B16 provide interfaces between bus 5 and respective Flash storage circuits 103-1 to 103-4 via respective port interfaces P1-P3 and P6 and respective buses 6-8 and 11. Thus, the network addresses of flash circuits 103-1 to 103-4 in the example first routing network 102-1 are the endpoint addresses identified as respective buses 6-8 and 11. Moreover, routing circuit s B14-B15 provide interfaces between bus 5 and respective first packet processing circuits 104-1 to 104-2 via respective port interfaces P4-P5 and respective buses 9-10. Thus, the network addresses of first packet processing circuits 104-1 to 104-2 in the example first routing network 102-1 are the endpoint addresses identified as respective buses 9-10.

Third switch 206 includes routing circuits B17-B21. Routing circuit B17 provides an interface between bus 14 and bus 15 via port interface P20. Routing circuits B18-B19 provide interfaces between bus 15 and respective Flash storage circuits 103-5 to 103-6 via respective port interfaces P7-P8 and respective buses 16-17. Thus, the network addresses of flash circuits 103-5 to 103-6 in the example first routing network 102-1 are the endpoint addresses identified as respective buses 16-17. Furthermore, routing circuits B20-B21 provide interfaces between bus 15 and respective first packet processing circuits 104-3 to 104-4 via respective port interfaces P9-P10 and respective buses 18-19. Thus, the network addresses first packet processing circuits 104-3 to 104-4 in the example first routing network 102-1 are the endpoint addresses identified as respective buses 18-19.

Mappings associated with ports of the root complex 402-1 and switches 202-206 act to configure the network 102-1 define point-to-point circuit paths (i.e. buses) between endpoints. In some embodiments, mappings are implemented with registers that store mapping information. As shown in FIG. 8A, for example, each switch port is associated with a routing circuit, and each routing circuit is associated with a mapping. The respective mappings associated with routing circuits indicate: the bus coupled to the routing circuit providing communication to/from higher in the hierarchy (referred to as a primary bus); the bus coupled to the routing circuit providing communication to/from lower in the hierarchy (referred to as a secondary bus); and an indication of a range of buses lower in the hierarchy (referred to as the subordinate buses) that are accessible from the routing circuit's secondary bus. In the illustrative example, buses are identified numerically. In some embodiments, buses are arranged in numerical order from top of the hierarchy, starting at the root, and moving from left to right. The first packet routing network 102-1 uses the mappings to route packets between endpoints. Packets routed through the network fabric include an indication of a target bus associated with a destination (i.e. target) endpoint. The switches access the target bus information within a packet transiting the network to determine its routing through the network.

Referring to the mapping associated with the routing circuit of switch port P16 coupled to routing circuit B7, for example, bus 1 is identified as the primary bus; bus 13 is identified as the secondary bus; and bus 13 is identified as the subordinate bus. Thus, only bus 13 lower in the hierarchy is accessible through the switch port P16 associated with routing circuit B7. A packet identifying bus 13 as the target bus, for example, would be routed through routing circuit B7.

Referring to the mapping associated with the routing circuit of switch port coupled to routing circuit B8, for example, bus B1 is identified as the primary bus; bus 14 is identified as the secondary bus; and bus 19 is identified as the subordinate bus. Thus, a range of buses 14-19 lower in the hierarchy are accessible through the switch port associated with routing circuit B8.

An example of point-to-point communication between endpoints internal to the system in accordance with the example mappings, in which the second packet processing circuit 116-1 acts as a requester and the first packet processing circuit 104-4 acts as a responder, proceeds as follows. A packet originating at the first logic circuit endpoint 116-1 that identifies bus 19 as the target bus, would be routed from bus 12, which is coupled to endpoint 116-1, through routing circuit B6 to bus 1, and then through routing circuit B8 to bus 14, and then through routing circuit B17 to bus 15, and then through routing circuit B21 to bus 19, which is coupled to the first packet processing circuit 104-4.

Referring to FIG. 8B, there is shown similar details of the illustrative example mappings for the second packet routing network 102-2. The first and second packet routing networks 102-1, 102-2 are substantially identical in structure and organization since they are intended to provide redundancy. The first packet routing network 102-1 is coupled to the first root complex 402-1, which is associated with the first management processor 112-1. The second packet routing network 102-2 is coupled to the second root complex 402-2, which is associated with the second management processor 112-2. The first and second packet routing networks 102-1, 102-2 provide redundant connectivity to the Flash storage circuits 103-1 to 103-6 and the first packet processing circuits 104-2 to 104-4. Therefore, the second packet routing network 102-2 shall not be described in detail herein. For convenience and ease of understanding, items in FIG. 8B that correspond to items in FIG. 8A are labelled with identical reference numerals that are primed in FIG. 8B are marked with primed reference numerals.

Packet Flows

Related sets of packets shall be referred to herein as a "packet flow". For example, multiple packets may be required to transmit a complete set of the data that is read from storage in response to a Read command or that is written to storage in response to a Write command, and all of the packets responsive to a given Read or Write request are related and collectively, constitute a single "flow".

Static Routing of Read/Write Requests

During a static routing Write operation, a Write request packet containing data to be written to a Flash storage circuit can follow a static route that, for example, includes one of the third I/O packet processing circuits 108-1 to 108-4 that acts as a source endpoint, that transits several devices, including routing circuits within one or more switches 202 to 206 or 222 to 226 and that terminates at a Flash storage circuit endpoint device, e.g., one or more of Flash circuits 103-1 to 103-6.

During a static routing Read operation, a Read request packet can follow a static route that, for example, can include one of the third I/O packet processing circuits 108-1 to 108-4 that acts as a source endpoint, that transits several devices, including routing circuits within one or more switches 202 to 206 or 222 to 226 and that terminates at a Flash storage circuit endpoint device, one of Flash circuits 103-1 to 103-6. In response to the Read request, Read data retrieved from storage device may be transmitted over a reverse route to the source I/O circuit endpoint that provided the Read request.

Alternatively, in accordance with some embodiments, data may be cached. In the course of a Write operation, the Write data is stored in cache DRAM 118-1 and/or cache DRAM 118-2. The Write data also is stored in a Flash storage circuit endpoint, e.g., one or more of 103-1 to 103-6. Conversely, during a Read operation, a determination is made as to whether the requested Read data is present in the cache DRAMs, and it if is, then the data is retrieved from the cache DRAM rather than obtain it from an endpoint storage device.

Dynamic Routing of Read/Write Requests

Key information within packets is used to determine whether packet flows are to be subject to a policy in accordance with some embodiments. Packets containing key information that corresponds to a policy have their payload content subjected to dynamic processing. As used herein, a "key" refers to information within a packet that indicates that the packet meets a criterion to qualify for a policy associated with a set of services. Different keys correspond to different policies. In some embodiments, key information indicates a prescribed storage location in Flash. Different storage locations may correspond to different keys, and therefore, packets indicating different prescribed storage locations may have different policies applied to them. Conversely, in some situations, multiple prescribed storage locations may have the same policies applied to them. Consequently, some situations, different key information that indicates different storage locations can correspond to the same policies.

In response to receipt of a packet containing a write request that contains prescribed key information, in accordance with some embodiments, packets, in a flow associated with the Write operation are routed among one or more packet processing circuits 104-1 to 104-2 and/or 116-1, 116-2 that impart services, which correspond to the prescribed policy associated with the key, to the data to be written while the data are en route in packets to a Flash storage device to which the data are to be written. It will be appreciated that one of the services may include cache services in which the data is written to cache storage so as to be available for faster access if that write data is the target of a subsequent read operation a short time later before the data is flushed from cache. In accordance with some embodiments, the data also are written to Flash, thereby obviating the need to store the data in a Flash circuit. Accordingly the write data may pass multiple times through one or the other of the routing networks 102-1, 102-2 to visit one or more packet processing circuits en route to a final endpoint destination Flash storage circuit.

In response to receipt of a packet containing a write request that contains prescribed key information, in accordance with some embodiments, packets in a flow associated with the Read operation are routed among one or more packet processing circuits 104-1 to 104-2 and/or 116-1, 116-2 that impart services, which correspond to a policy associated with the key, to the data that is read while the data are en route in packets from the Flash storage device to an original source endpoint that launched the Read request. It will be appreciated that one of the services may include cache services in which the sought after data may be obtained from cache storage, thereby obviating the need to obtain the data from a Flash circuit. Accordingly the read data may pass multiple times through one or the other of the routing networks 102-1, 102-2 to visit one or more packet processing circuits en route back to an originally requesting endpoint.

Configuring Dynamic Routing Circuits

A configuration process is used to configure the system 100 to selectively deliver services to packets based upon packet content such as a Flash storage location indicated within a received packet. Configuration can involve defining information structures and programming of logic within one or more of the first, second and third packet processing circuits 104-1 to 104-4, 116-1, 116-2 and 108-1 to 108-4 to provide service to packets on a selective basis. It will be appreciated that configuration can be changed from time to time while the system is operating, for example, to turn a service on or off with respect to selected packets addressed to selected Flash storage locations, for example.

FIG. 9, is an illustrative drawing representing an example first information structure 500 stored in a computer readable storage device 502 that associates services with routing network addresses of packet processing circuits to be configured to provide the services in accordance with some embodiments. For example, Service A is associated with the network address of packet processing circuit 104-1, and Service F is associated with the endpoint address of packet processing circuit 104-6. Packet processing circuits 104-5 and 104-6, which are not shown in the above drawings, are included to provide a more robust example. In some embodiments in which the routing networks 102-1, 102-2 are PCIe compliant the indicated network addresses are endpoint addresses. The storage device 502 can be a portion of local memory 113-1 and/or 113-2. The contents of the first information structure 500 may be determined by an administrator of the system 100 or may be determined automatically by the system 100, for example.

FIGS. 10A-10B are illustrative flow diagram of a processes 600, 620 to use processors 112-1 and/or 112-2 to configure the first, second and third packet processing circuits 104-1 to 104-4, 116-1, 116-2 and 108-1 to 108-4, to perform services in accordance with some embodiments. Referring to FIG. 10A, module 602 of process 600 configures one or the other of processors 112-1, 112-2 to select a packet processing circuit to configure to perform a service. Module 604 configures the processor to send configuration information over one of the routing networks 102-1, 102-2 to configure the selected processing circuit. Configuration files used to configure each service to be configured can be stored in local memory storage devices 113-1 and/or 113-2. Referring to FIG. 10B, the module 622 of process 620 configures the selected packet processing circuit to receive the configuration information. Module 624 configures the selected packet processing circuit to configure its circuitry to perform the service according to the configuration information.

The processes 600, 620 are performed for each service. Thus, for example, the processes 600, 620 may configure one of the first packet processing circuits 104-1 to 104-4 to impart compression/decompression services; may configure another of the first packet processing circuits to impart de-duplication/duplication services; may configure another of the first packet processing circuits to impart encryption/decryption services; may configure another of the first packet processing circuits to impart RAID services; etc. Furthermore, for example, the processes 600, 629 may configure the second packet processing circuits 116-1, 116-2 to impart cache services. Additionally, for example, the processes 600, 629 may configure the third packet processing circuits 108-1 to 108-4 to impart network interface services.

FIG. 11 is an illustrative drawing representing an example second information structure 700 stored in a computer readable storage device 702 that associates packet flow identifiers, key information and policy information in accordance with some embodiments. The storage device 702 can be a part of local memory 113-1 and/or 113-2. The key information identifies information within a received packet that is indicative of a policy associated with the packet. In some embodiments, key information includes a Flash storage location. Alternatively, the key information may include a Flash storage location in combination with a prescribed command, such as Read or Write, for example. The policy information indicates services associated with a policy and a sequence of their delivery in accordance with the policy. Certain services must be performed in a specified order relative to each other. For example, decompression ordinarily must be performed prior to decryption. The policy information indicates the order in which services are to be imparted to packet contents, and by implication, the endpoint routing order from one packet processing circuit to the next. In accordance with some embodiments, the contents of the second information structure 700 may be determined by an administrator of the system 100, for example.

In some embodiments, the key information includes an instruction to access a storage location within a storage device. In particular, for example, and the instruction may request access, to Read or Write, to a storage location associated with one or more of Flash storage circuits 103-1 to 103-6. For example, a packet may include an iSCSI command that specifies LUN (logical unit number) in combination with a Logical Block Address (LBA) used to specify a Flash storage device for a read or write operation. In some embodiments, a key may include a particular LUN plus a LBA in combination with a Read command or a Write command within a packet. In some embodiments, a key may include a particular LUN plus a LBA in combination with a Read command or a Write command and in combination with a network address such as an IP address of an end-user subscriber. It will be appreciated that a typical storage device, such as a Flash storage device, may be accessed using the iSCSI protocol. In accordance with the iSCSI protocol, an iSCSI target may manage numerous logical units. A LUN serves as an instance identifier for a SCSI logical unit that uniquely identifies a SCSI logical unit within the scope of a given SCSI target at a given time. In some embodiments, a SCSI target identifier in combination with a LUN and a LBA constitutes a storage address. A SCSI LBA is a value used to reference a logical block within a SCSI logical unit.

In operation as explained more fully below, for example, in response to receiving a packet, a third I/O packet processing circuit, one of 108-1 to 108-4, adds to the received packet a flow identifier associated with key information within the received packet. The flow identifier indicates a policy, which is associated with a sequence of services to be imparted to the packet and endpoint routing to be followed by the packet as it is transmitted over one or the other of the routing networks 102-1, 102-2 from one packet processing circuit to the next.

Figure 12:
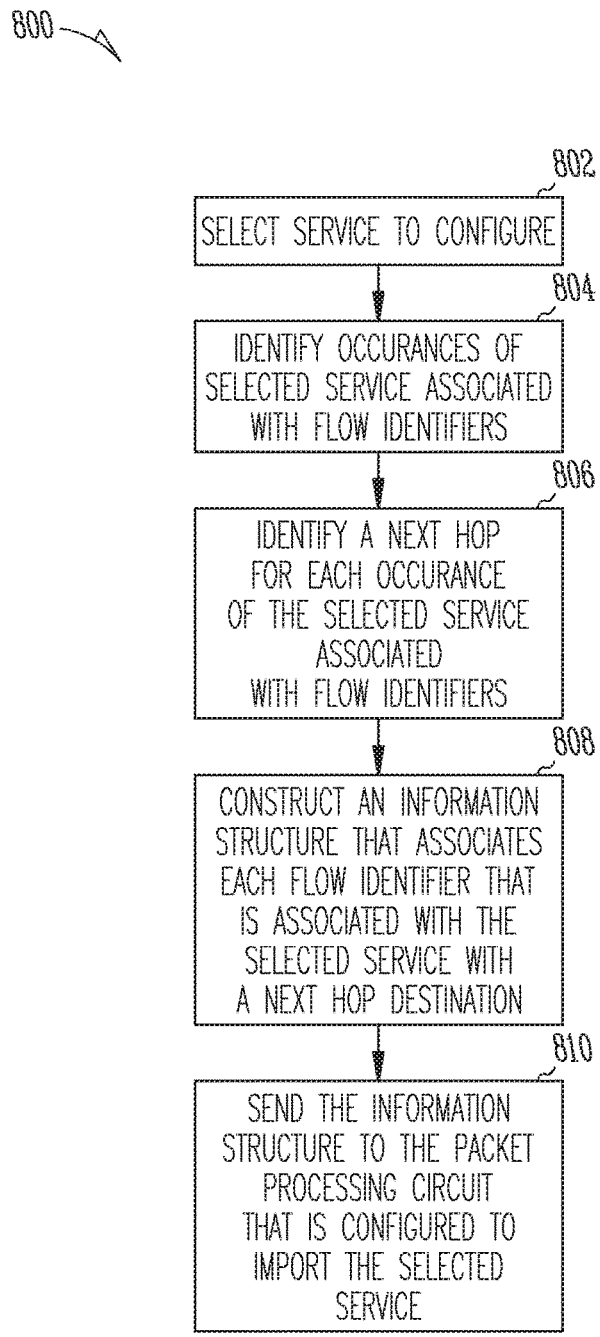
FIG. 12 is an illustrative flow diagram of a process to produce and distribute next-hop tables in accordance with some embodiments.

FIG. 12 is an illustrative flow diagram of a process 800 to produce and distribute next-hop tables in accordance with some embodiments. Module 802 configures one or the other of management processors 112-1, 112-2 to select a service identified in the second information structure 700. Module 804 of process 800 configures one or the other of management processors 112-1, 112-2 to refer to the second information structure 700 and to identify respective occurrences of the selected service associated with respective flow identifiers. For each flow identifier and each service associated with a flow identifier, module 806 configures a management processor to refer to the second information structure 700 and to identify a next service to be performed after a selected service associated with the flow identifier. For example, referring to the row of the second information structure 700 that contains flow identifier 1A, assuming that Service A (SVC A) is the identified selected service, Service B (SVC B) is the next service to be performed after the identified occurrence of Service A (SVC A); referring to the row of the second information structure 700 that contains flow identifier 1B, assuming that Service A (SVC A) is the identified selected service, Service D (SVC D) is the next service to be performed; referring to the row of the second information structure 700 that contains flow identifier 1C, assuming that Service A (SVC A) is the identified selected service, Service B (SVC B) is the next service to be performed after the identified occurrence of Service A (SVC A); etc. Module 808 configures the processor to produce a third information structure, explained more fully below with reference to FIGS. 13A-13F, that associates a flow identifier with a next hop endpoint destination address to be visited by a packet after the imparting of the service. Module 810 configures a management processor 1122-1 or 112-2 to send the respective the third information structure to the respective packet processing circuit that is configured to impart the selected service. For example, a third information structure that corresponds to Service A is sent to a packet processing circuit configured to impart Service A. The process 800 of FIG. 12 is performed for each service.

FIGS. 13A-13F are illustrative drawings that show an illustrative example set of third information structures 900A to 900F, stored in computer readable storage devices associated with packet processing circuits in accordance with some embodiments. Each third information structure corresponds to a different service. For example, the third information structure 900A corresponds to Service A. A management processor distributes the third information structures 900A-900F to the packet processing circuits configured to impart the corresponding services. For example, structure 900A is delivered to the packet processing circuit that provides Service A.

The third information structures 900A to 900F indicate next endpoint hops for packet flows as a function of service provided and flow identifiers. More specifically, the third information structures show flow identifier-next hop endpoint destination address pairs that indicate the next hops for received packets as a function of flow identifier contained within the received packets. For example, the third information structure 900A indicates that after imparting Service A to a packet containing flow identifier 1A, the packet is transmitted to the packet processing circuit that performs Service B; a packet containing flow identifier 1B is transmitted to the packet processing circuit that performs Service D; a packet containing flow identifier 1C is transmitted to the packet processing circuit that performs Service B; and a packet containing flow identifier 1F is transmitted to controller logic associated with the Flash storage device associated with LUN1.

It will be appreciated that, collectively, the third information structures of FIGS. 13A-13F define multiple distributed next hop information structures. A different distributed next hop information structure is defined for each respective policy. For each policy the distribured next hop information structure includes multiple routing structure portions that are distributed across multiple packet processing circuits and possibly a Flash circuit (i.e. its memory controller). For example, a routing structure portion of a distributed next hop information structure that corresponds to flow identifier 1A has a portion stored at a packet processing circuit that imparts Service A and that stores the third information structure of FIG. 13A, which indicates a next hop endpoint destination address of a packet processing circuit that imparts Service B. Another routing structure portion of the distributed next hop information structure that corresponds to flow identifier 1A is stored at the packet processing circuit that imparts Service B and that stores the third information structure of FIG. 9B, which indicates a next hop endpoint destination address of a packet processing circuit that imparts Service C. Another portion of the distributed next hop information structure that corresponds to flow identifier 1A is stored at the packet processing circuit that imparts Service C and that stores the third information structure of FIG. 9C, which indicates a next hop endpoint destination address of a packet processing circuit that imparts Service D. Another portion of the distributed next hop information structure that corresponds to flow identifier 1A is stored at the packet processing circuit that imparts Service D and that stores the third information structure of FIG. 9D, which indicates a next hop endpoint destination address of a Flash storage circuit that stores LUN1.

FIG. 14 is an illustrative drawing representing an example fourth information structure 1000 stored in a computer readable device 1002 in accordance with some embodiments. The fourth information structure 1000 associates flow identifier information and key information with next endpoint hops. The third flow identifier information structure 1000 can be used used to configure an initiator of dynamic routing, such as third I/O packet processing circuits 108-1 to 108-4. For example, a third I/O packet processing circuit that receives a packet from the external network 106 can determine whether key information in the information structure 1000 matches information in a received packet to determine whether the received packet is subject to a policy, such as a policy shown in FIG. 11. In response to a determination that a received packet is subject to a policy, third flow identifier information structure 1000 can be used to configure the third I/O packet processing circuit that receives the packet to add corresponding flow identifier to the received packet. The third I/O packet processing circuit then can use transmit the packet containing the flow identifier over one of the first or second packet network 102-1, 102-2 to a next destination hop circuit that imparts a next service according to the policy. For example, a third I/O packet processing circuit that receives a packet that contains the key (CMD1, LUN3) adds the flow identifier 1C to the packet and sends the packet to a endpoint that provides Service A.

Packet Processing Circuit Operation

Packet processing circuits, disposed at endpoints of the routing networks 102-1, 102-2 control the dynamic routing of packets. The third I/O packet processing circuits 108-1 to 108-4 control initiation of dynamic routing. First and second packet processing circuit endpoints 104-1 to 104-4 and 116-1, 116-2 control next hop routing of packets received by them. The memory controller 180 associated with the Flash storage devices 103-1 to 103-6 controls dynamic routing of Read requests. The following paragraphs explain configuration of these circuits to perform the processes to control dynamic routing.

Figure 15:
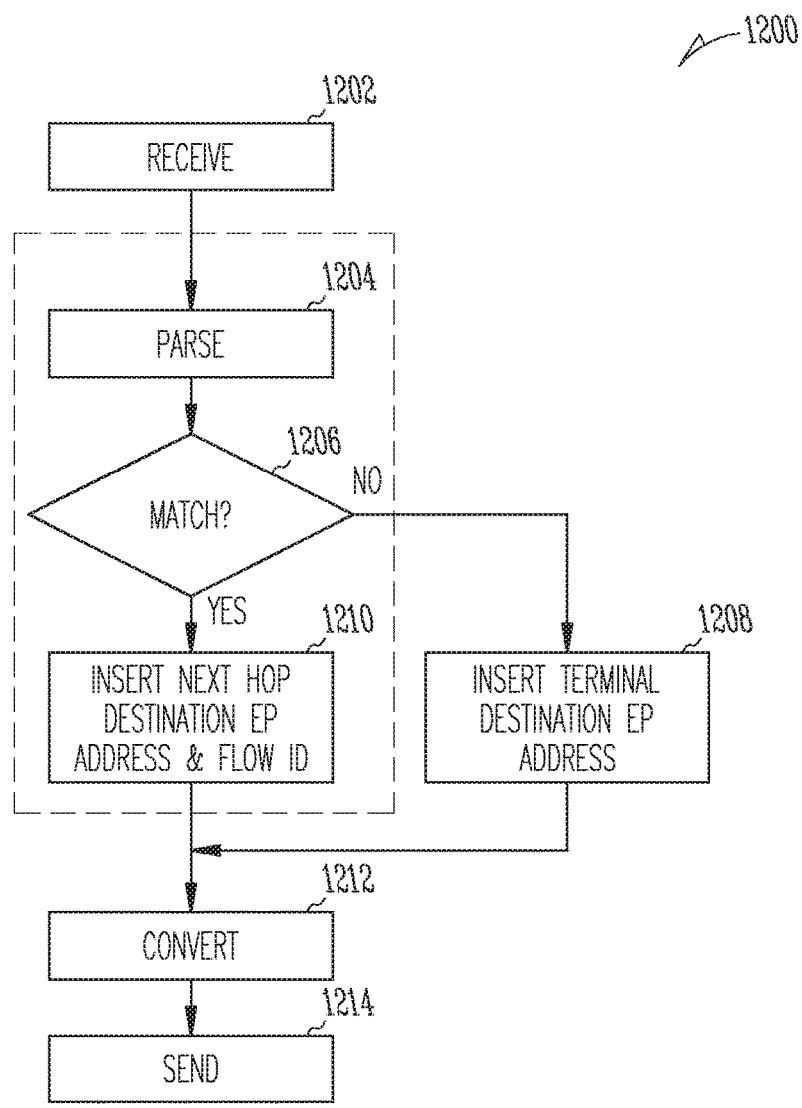
FIG. 15 is an illustrative flow diagram representing operation of the representative third (I/O) packet processing circuit of FIG. 4 in accordance with some embodiments.

FIG. 15 is an illustrative flow diagram representing operation of the representative third I/O packet processing circuit 108-1 of FIG. 4 in accordance with some embodiments. It will be understood that the operation of the representative third I/O packet processing circuit 108-1 is representative of that of the other first packet processing circuits 108-2 to 108-4. Module 1202 configures the I/O circuit 108-1 to receive a packet. A packet having a first format, such as Ethernet for example, may be received from the external network 106, for example. Module 1204 configures the circuit to parse the received packet. Decision module 1206 refers to the fourth information structure 1000 of FIG. 14 to determine whether the received packet includes key information that corresponds to a packet flow identifier. In other words, in essence, the decision module 1206 determines whether the received packet should be associated with a packet flow.

In response to a determination that the received packet does not include key information that corresponds to a packet flow identifier, module 1208 configures the I/O circuit 108-1 to insert into a header portion of the packet a terminal endpoint destination address such as that of a Flash storage circuit to be accessed in response to the packet. It will be appreciated that a terminal destination endpoint on the packet network 102-1, 102-2 can be determined based upon information contained within the received packet. For example, a packet in the first format received over the external network 106 may indicate a particular LUN and LBA, and that LUN, LBA combination may be known to correspond to a particular storage location of a Flash storage circuit. Module 1212 configures the third I/O packet processing circuit 108-1 to impart the protocol conversion service represented by block 109-7 in FIG. 4. Module 1214 configures the third I/O packet processing circuit to transmit the packet onto one of the routing networks 102-1, 102-2.

In response to a determination that the received packet does include key information that corresponds to a packet flow identifier, module 1210 configures the third I/O circuit 108-1 to refer to the fourth information structure 1000 of FIG. 14 to determine a flow identifier and a next hop destination for the packet. A determination that the received packet includes key information that corresponds to a packet flow identifier determines that the packet is to be associated with a sequence of endpoints associated with the packet flow identifier. Module 1210 further configures the I/O circuit to add the determined next hop destination address in a header portion of the packet, and to also include a determined flow identifier in the header portion of the packet. Module 1212 configures the third I/O packet processing circuit 108-1 to impart the protocol conversion service represented by block 109-7 in FIG. 4. Module 1214 configures the third I/O packet processing circuit to transmit the packet onto one of the routing networks 102-1, 102-2. In some embodiments, modules 1204, 1206 and 1210 within dashed lines 1216 correspond to next hop address determination block of FIG. 4.

Figure 16:
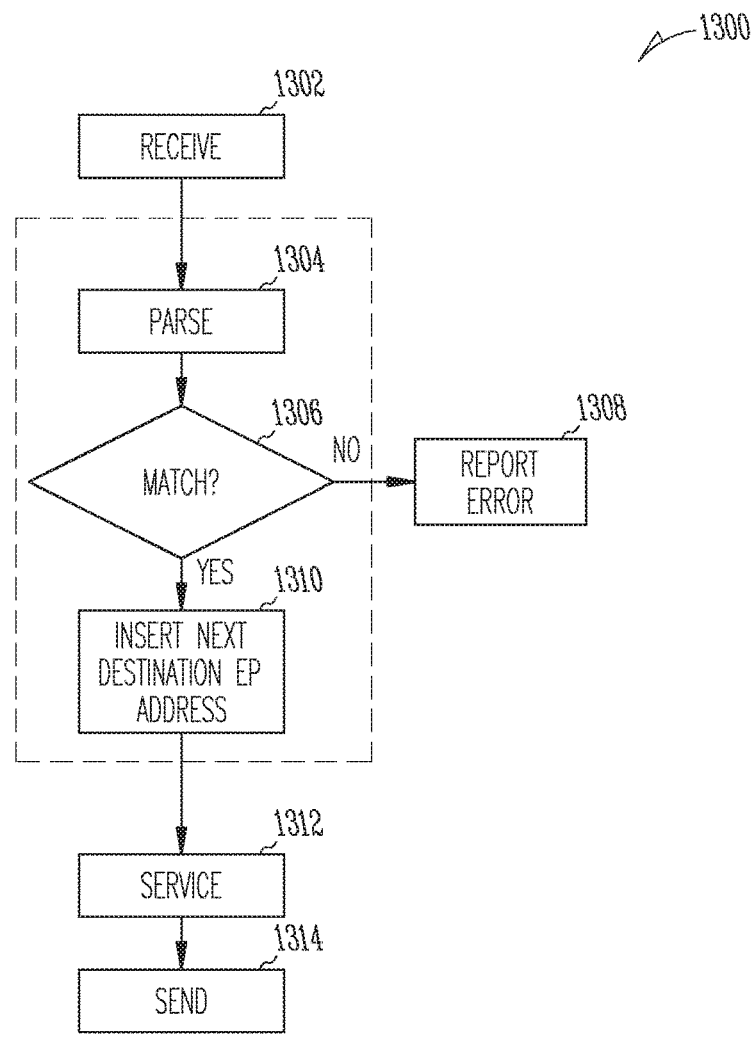
FIG. 16 is an illustrative flow diagram representing operation of the representative first packet processing circuit of FIG. 2 in accordance with some embodiments.

FIG. 16 is an illustrative flow diagram representing operation of the representative first packet processing circuit 104-1 of FIG. 2 in accordance with some embodiments. It will be understood that the operation of the representative first packet processing circuit 104-1 is representative of that of the other first packet processing circuits 104-2 to 104-4. Module 1302 configures the first packet processing circuit 104-1 to receive a packet. A packet having a second format, such as a PCIe compatible format for example, may be received from another endpoint of one of the routing networks 102-1, 102-2, for example. Module 1304 configures the circuit to parse the received packet. Decision module 1306 refers to a next hop, third information structure that was provided to the receiving dynamic routing circuit at configuration time, to determine whether a received packet includes a packet flow identifier that corresponds to a service provided by the receiving first packet processing circuit 104-1. In response to a determination by decision module 1306 that the received packet does not include a matching packet flow identifier, module 1308 configures the circuit 104-1 to transmit to a management processor 112-1 or 112-2 an error message that provides notification that a packet that does not include a matching packet flow identifier has been received by the circuit 104-1. Such error message can be useful for trouble-shooting, for example. In response to a determination by decision module 1306 that the received packet does include a matching packet flow identifier, control next flows to module 1310, which configures the receiving first packet processing circuit 104-1 to refer to the respective third next hop information structure associated with the receiving packet processing circuit to determine a next hop for the packet based at least in part upon the received packet's flow identifier, and to modify the received packet's header to include the determined next hop destination address. Module 1312 configures the receiving first packet processing circuit 104-1 to impart the service represented by block 109-1 in FIG. 2 to the received packet. It will be understood that different first packet processing circuits may impart different services. Module 1314 configures the receiving first packet processing circuit 104-1 to transmit the packet onto one of the routing networks 102-1, 102-2. In some embodiments, modules 1304-1310 within dashed lines 1316 correspond to next hop address determination block of FIG. 2.

It will be appreciated that the process of FIG. 16 also can be used to control the second (cache) packet processing circuit 116-1 of FIG. 3.

Figure 17:
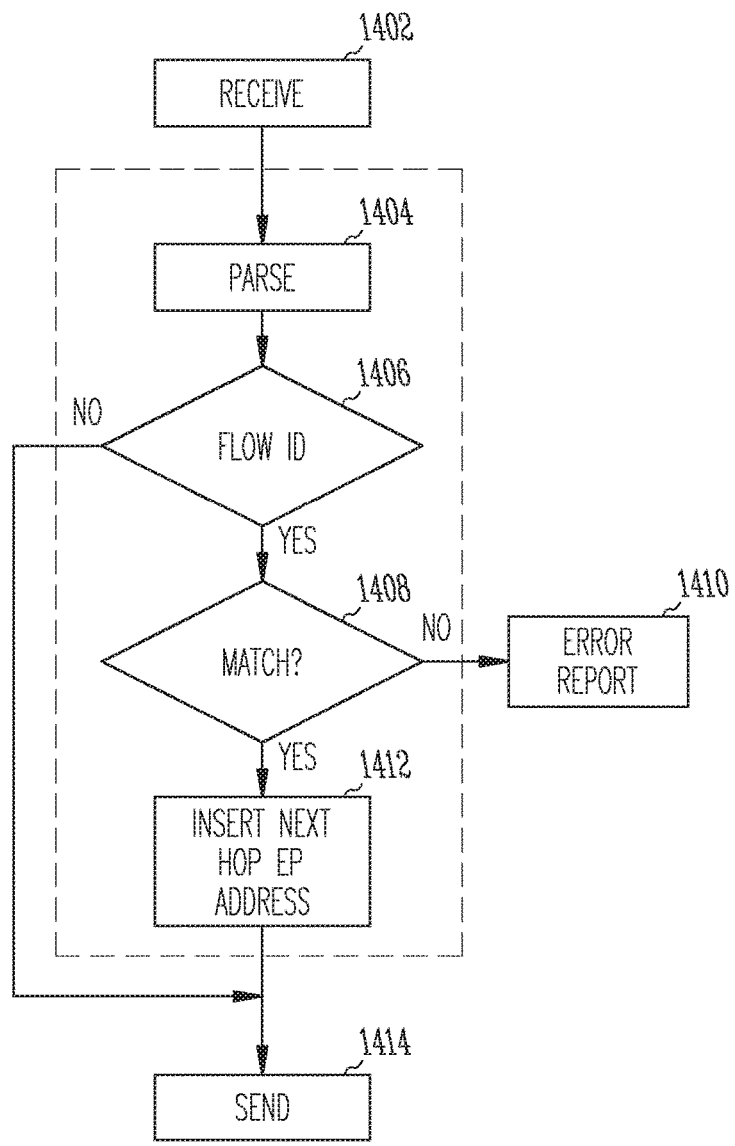
FIG. 17 is an illustrative flow diagram representing operation of the memory controller in response to a Read request in accordance with some embodiments.

FIG. 17 is an illustrative flow diagram representing operation of the memory controller 180 in response to a Read request in accordance with some embodiments. Module 1402 configures the memory controller 180 to receive a packet. A packet having a second format, such as a PCIe compatible format for example, may be received from one of the third I/O packet processing circuits 108-1 to 108-4, for example. Alternatively, such packet may be received from one of the second "cache" packet processing circuits 116-1, 116-2, for example. Module 1404 configures the memory controller to parse the received packet. Decision module 1406 configures the memory controller 180 to determine whether the received packet includes a flow identifier. In response to a determination that the received packet does not include a flow identifier, control flows to module 1414, which configures the memory controller 180 to send the Read data to a requester, e.g., to a third I/O packet processing circuit or a second cache packet processing circuit. In response to a determination that the received packet does include a flow identifier, control flows to decision module 1408, which refers to a respective third information structure that was provided to the receiving memory controller 180 at configuration time, to determine whether the packet identifier in the received packet corresponds to a next hop address indicated in the third information structure. In response to a determination by decision module 1408 that the received packet does not include a matching packet flow identifier, module 1410 configures the memory controller 180 to transmit to a management processor 112-1 or 112-2 an error message that provides notification that a packet that does not include a matching packet flow identifier has been received by the controller. In response to a determination by decision module 1408 that the received packet does include a matching packet flow identifier, control next flows to module 1412, which configures the memory controller 180 to refer to the third information structure associated with the controller to determine a next hop for the packet based at least in part upon the received packet's flow identifier, and to modify a header portion of the packet to include the determined next hop destination address. Module 1414 configures the controller to transmit the packet onto one of the routing networks 102-1, 102-2 for delivery to the next hop.

Example Packet Processing Circuit Configurations

Figure 18A:
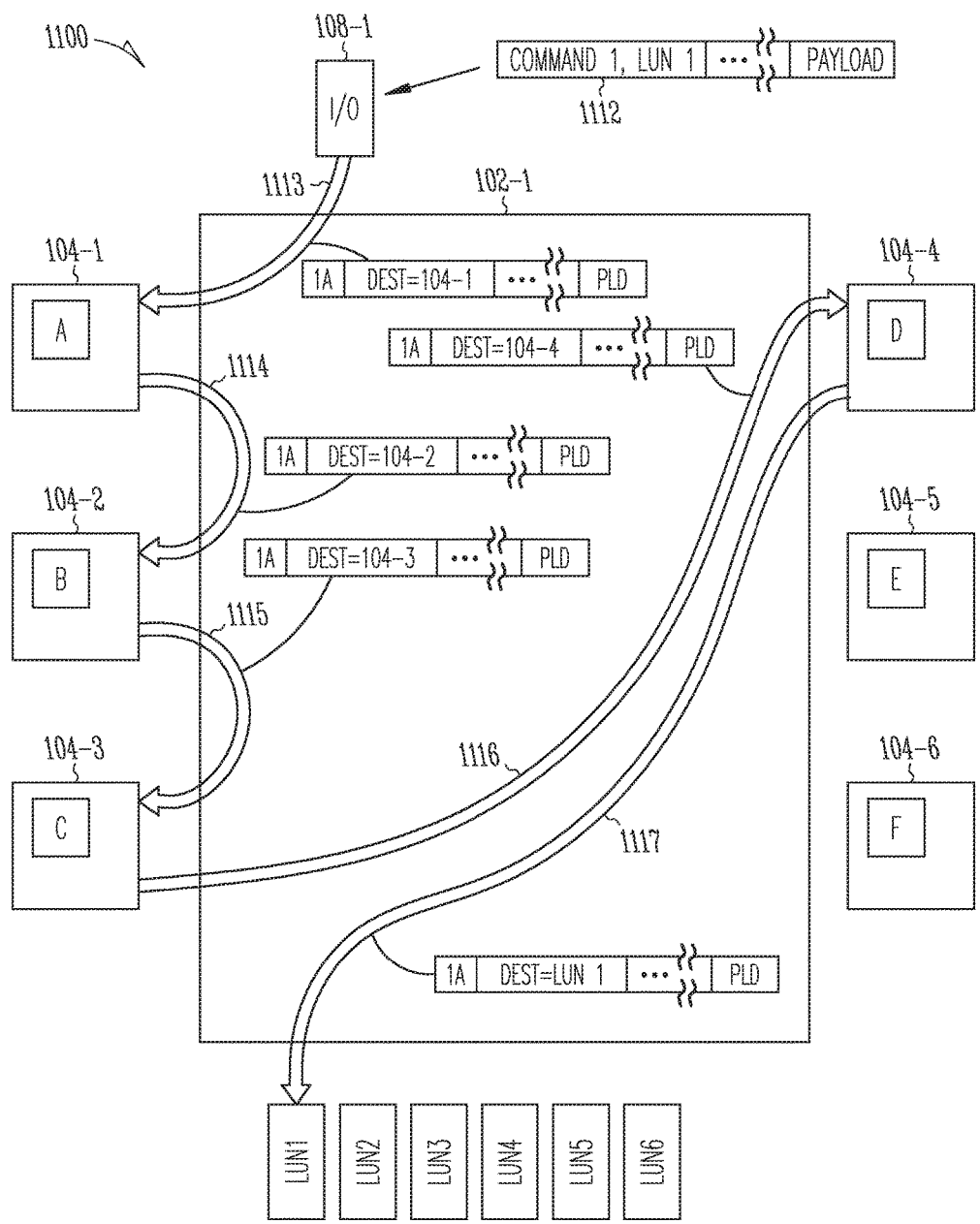
FIGS. 18A-18C are illustrative functional block diagrams showing multiple different example dynamic configurations of the system 100 of FIG. 1 to propagate packets through routes that include sequences of endpoints defined by distributed routing structure portions of distributed routing structures in accordance with some embodiments.
Figure 18B:
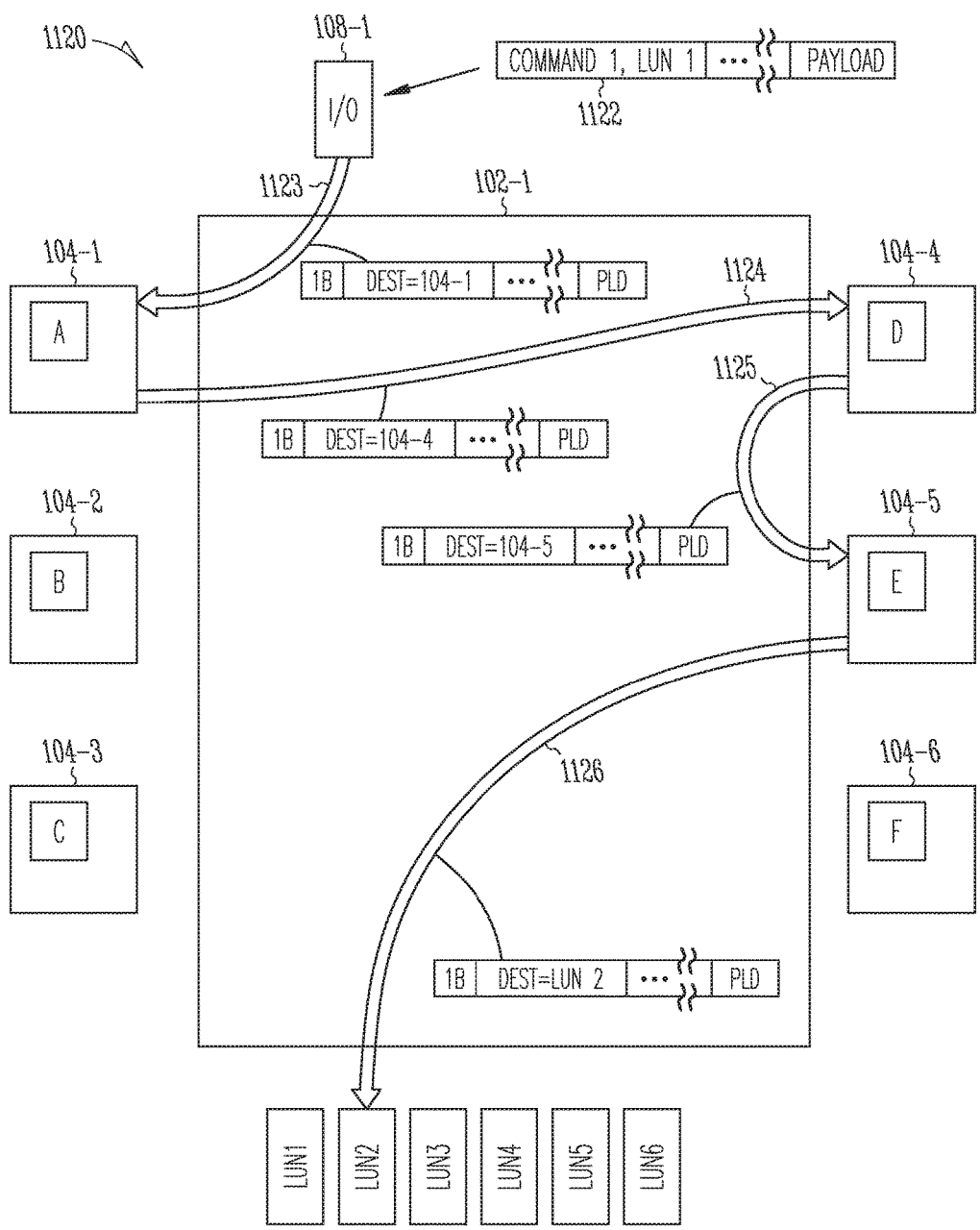
Figure 18C:
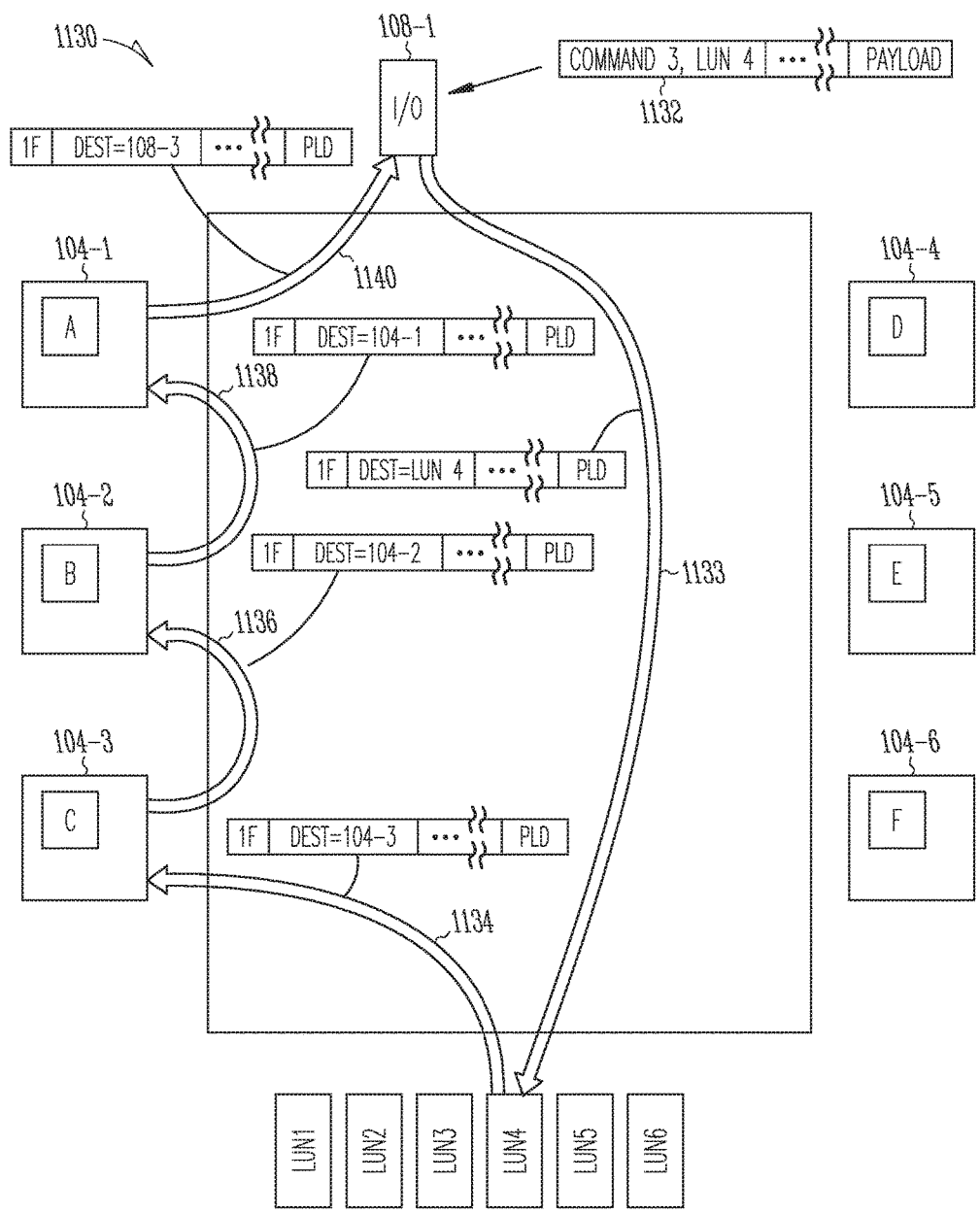

FIGS. 18A-18C are illustrative functional block diagrams showing multiple different example dynamic configurations of the system 100 of FIG. 1 in accordance with some embodiments. FIGS. 18A-18C illustrate propagation of packets through sequences of endpoints defined by distributed routing structure portions of distributed routing structures in accordance with some embodiments. The drawings of FIGS. 18A-18C are simplified to remove details unnecessary to the explanation of the different configurations. For example, only one of the two routing networks and only a few representative packet processing circuits are shown and the management processors are not shown. FIGS. 18A-18C show LUN1 -LUN6, which correspond to storage locations within Flash storage circuits 103-1 to 103-6. It is noted that in order to provide richer example, six (rather than four) different illustrative example packet processing circuits are shown. The system 100 is shown to include a memory controller 180 that controls access to the storage circuits 103-1 to 103-6. The example configurations of FIG. 18A-18C illustrate the use of a distributed routing structure. As explained above, each of the third information structures of 13A-13F is distributed to a different packet processing circuit. The fourth information structure 1000 of FIG. 14 is distributed to the third I/O packet processing circuit 108-1, which is configured to use it to determine whether a receive packet has information that matches a key, and therefore, is subject to a policy. The third I/O packet processing circuit 108-1 also is configured to use the fourth information structure 1000 to determine a first hop for a received packet. The third information structure 900A of FIG. 13A is distributed to the first packet processing circuit 104-1, which is configured to perform Service A and is configured to use the example third information structure 900A to determine a next hop. The third information structure 900B of FIG. 13B is distributed to the first packet processing circuit 104-2, which is configured to perform Service B and is configured to use the example third information structure 900B to determine a next hop. The third information structure 900C of FIG. 13C is distributed to the first packet processing circuit 104-3, which is configured to perform Service C and is configured to use the example third information structure 900C to determine a next hop. The third information structure 900D of FIG. 13D is distributed to the first packet processing circuit 104-4, which is configured to perform Service D and is configured to use the example third information structure 900D to determine a next hop. The third information structure 900B of FIG. 13E is distributed to the first packet processing circuit 104-5, which is configured to perform Service E and is configured to use the example third information structure 900E to determine a next hop. The third information structure 900F of FIG. 13F is distributed to the first packet processing circuit 104-6, which is configured to perform Service F and is configured to use the example third information structure 900F to determine a next hop.

Examples of Dynamic Routing in Operation

Example 1

Referring to the first dynamic configuration 1100 of FIG. 18A, assume that the third I/O packet processing circuit 108-1 receives a packet 1112. The circuit 108-1 parses the received packet 1112 and determines that it includes a header portion that indicates Command1, and that indicates the storage location, LUN1 and that includes payload data (PLD). Assume in this example that Command1 indicates a Write operation and that the PLD includes data that is to be written to a Flash storage location corresponding to LUN2. Additional details of the packet are omitted in order to simplify the explanation. The third I/O packet processing circuit 108-1, which is configured according to the process 1200 of FIG. 15 refers to a portion of the fourth information structure 1000 of FIG. 14 and recognizes that the header information (Command1, LUN1) matches the key for packet flow 1A, which is associated in the structure 1000 with the endpoint destination address of the packet processing circuit that imparts service A. Thus, in essence, the circuit 108-1 determines that the received packet 1112 is to be associated with the sequence of endpoints 104-1, 104-2, 104-3, 104-4 and LUN1 shown in FIG. 18A. In this example, packet processing circuit 104-1 is configured to impart Service A. Accordingly, the third I/O packet processing circuit 108-1 adds the packet flow identifier 1A to the packet, imparts its protocol conversion service, adds an endpoint destination address that identifies the first packet processing circuit 104-1, and transmits the packet on to the routing network 102-1.

As indicated by the arrow 1113, in response to receiving the converted packet 1112 with the added destination address, the routing circuit 102-1 transmits the packet to the first packet processing circuit 104-1. The first packet processing circuit 104-1 is configured according to the process 1300 of FIG. 16. Accordingly, the first packet processing circuit 104-1 identifies the flow identifier 1A in the received packet and imparts Service A to the packet. The first packet processing circuit 104-1 refers to the routing structure portion of its next hop data structure 900A that includes the association (1A, Svc B) to determine a next hop for the packet, and modifies the endpoint destination information in the packet so as to indicate the network address of the first packet processing circuit 104-2, which is configured to perform Service B. The first packet processing circuit 104-1 then transmits the modified packet 1112 on to the routing network 102-1.

As indicated by the arrow 1114, in response to receiving the modified packet 1112, the routing network 102-1 transmits the packet to the first packet processing circuit 104-2. The first packet processing circuit 104-2 identifies the flow identifier 1A in the received packet and imparts Service B to the packet. The first packet processing circuit 104-2 refers to the routing structure portion of its next hop data structure 900B that includes the association (1A, Svc C) to determine a next hop for the packet, and modifies the endpoint destination information in the packet so as to indicate the network address of the first packet processing circuit 104-3, which that is configured to perform Service C. The first packet processing circuit 104-2 then transmits the modified packet 1112 on to the routing network 102-1.

As indicated by the arrow 1115, in response to receiving the modified packet 1112, the routing network 102-1 transmits the packet to the first packet processing circuit 104-3. The first packet processing circuit 104-3 identifies the flow identifier 1A in the received packet and imparts Service C to the packet. The first packet processing circuit 104-3 refers to the routing structure portion of its next hop data structure its next hop data structure 900B that includes the association (1A, Svc D) to determine a next hop for the packet, and modifies the endpoint destination information in the packet so as to indicate the network address of the first packet processing circuit 104-4, which is configured to perform Service D. The first packet processing circuit 104-3 then transmits the modified packet 1112 on to the routing network 102-1.

As indicated by the arrow 1116, in response to receiving the modified packet 1112, the routing circuit 102-1 transmits the packet to the first packet processing circuit 104-4. The first packet processing network 104-4 identifies the flow identifier 1A in the received packet and imparts Service D to the packet. The first packet processing circuit 104-4 refers to the routing structure portion of its next hop data structure its next hop data structure 900B that includes the association (1A, LUN1) to determine a next hop for the packet and modifies the endpoint destination information in the packet so as to indicate the network address of LUN1. The first packet processing circuit 104-4 then transmits the modified packet 1112 on to the routing network 102-1.

As indicated by the arrow 1117, in response to receiving the modified packet 1112, the routing circuit 102-1 transmits the packet, via memory controller 180 to LUN1, which corresponds to a storage location within one or more of the Flash circuits (not shown). The memory controller 180, which manages LUN1, manages the operation indicated by CMND1, which for example, may be a Write operation.

It will be appreciated that a distributed endpoint routing information structure corresponding to flow identifier 1A includes multiple routing information structure portions that are disposed at different packet processing circuits. A portion (1A, Svc B) is disposed at packet processing circuit 104-1. A portion (1A, Svc C) is disposed at packet processing circuit 104-2. A portion (1A, Svc D) is disposed at packet processing circuit 104-3. A portion (1A, LUN1) is disposed at packet processing circuit 104-4. The individual next hop addresses in the individual portions collectively define a sequence of next hop endpoint destination addresses and thereby define a sequence of services that correspond to a policy to be applied to a packet that contains the example key (Command1, LUN1). Example 2 Referring to the first dynamic configuration 1120 of FIG. 18B, assume that the third I/O packet processing circuit 108-1 receives a packet 1122. The circuit 108-1 parses the received packet 1122 and determines that it that includes a header portion that indicates Command1, and that indicates the storage location, LUN2 and that includes payload data (PLD). Assume that Command1 indicates a Write operation and that the PLD includes data that is to be written to a Flash storage location corresponding to LUN2. Additional details of the packet are omitted in order to simplify the explanation. The third I/O packet processing circuit 108-1 refers to a portion of the fourth information structure 1000 of FIG. 14 and recognizes that the header information (Command1, LUN2) matches the key for packet flow 1B, which is associated in the structure 1000 with the endpoint destination address of the packet processing circuit that imparts service A. Thus, in essence, the circuit 108-1 determines that the received packet 1122 is to be associated with the sequence of endpoints 104-1, 104-4, 104-5, and LUN2 shown in FIG. 18B. In this example, packet processing circuit 104-1 is configured to impart Service A. Accordingly, the third I/O packet processing circuit 108-1 adds the packet flow identifier 1B to the packet, imparts the protocol conversion service, adds an endpoint destination address that identifies the first packet processing circuit 104-1, which is configured to perform Service A, and transmits the packet on to the routing network 102-1.

As indicated by the arrow 1123, in response to receiving the converted packet 1122 with the added destination address, the routing circuit 102-1 transmits the packet to the first packet processing circuit 104-1. The first packet processing circuit 104-1 identifies the flow identifier 1B in the received packet and imparts Service A to the packet. The first packet processing circuit 104-1 refers to the routing structure portion of its next hop data structure 900A that includes the association (1A, Svc D) to determine a next hop for the packet and modifies the destination information in the packet so as to indicate an endpoint destination address of the first packet processing circuit 104-4, which is configured to perform Service D. The first packet processing circuit 104-1 then transmits the modified packet 1112 on to the routing network 102-1.

As indicated by the arrow 1124, in response to receiving the converted packet 1122 with the added destination address, the routing circuit 102-1 transmits the packet to the first packet processing circuit 104-4. The first packet processing circuit 104-4 identifies the flow identifier 1B in the received packet and imparts Service D to the packet The first packet processing circuit 104-4 refers to the routing structure portion of its next hop data structure 900D that includes the association (1B, Svc E) to determine a next hop for the packet and modifies the destination information in the packet so as to indicate an endpoint destination address of the first packet processing circuit 104-5, which is configured to perform Service E. The first packet processing circuit 104-4 then and transmits the modified packet 1122 on to the routing network 102-1.

As indicated by the arrow 1125, in response to receiving the converted packet 1122 with the added destination address, the routing circuit 102-1 transmits the packet to the first packet processing circuit 104-5. The first packet processing circuit 104-5 identifies the flow identifier 1B in the received packet and imparts Service E to the packet. The first packet processing circuit 104-5 refers to the routing structure portion of its next hop data structure 900E that includes the association (1B, Svc E) to determine a next hop for the packet and modifies the destination information in the packet so as to indicate an endpoint destination address of LUN2. The first packet processing circuit 104-5 then and transmits the modified packet 1122 on to the routing network 102-1.

As indicated by the arrow 1126, in response to receiving the modified packet 1122, the routing circuit 102-1 transmits the packet to LUN2, which corresponds to storage locations in one or more Flash circuits (not shown). The memory controller 180, which manages LUN2, manages the operation indicated by Command1, which for example, may be a Write operation.

A distributed endpoint routing information structure corresponding to flow identifier 1B includes multiple routing information structure portions that are disposed at different packet processing circuits. A portion (1B, Svc D) is disposed at packet processing circuit 104-1. A portion (1B, Svc E) is disposed at packet processing circuit 104-4. A portion (1B, Svc E) is disposed at packet processing circuit 104-5. A portion (1B, LUN2) is disposed at packet processing circuit 104-4. The individual next hop addresses in the individual portions collectively define a sequence of next hop destination addresses and thereby define a sequence of services that correspond to a policy to be applied to a packet that contains the example key (Command1, LUN2).

Example 3

Referring to the first dynamic configuration 1130 of FIG. 18C, assume that the third I/O packet processing circuit 108-1 receives a packet 1132 that includes a header portion that indicates the Command3 and that indicates the storage location, LUN4. Additional details of the packet are omitted in order to simplify the explanation. Assume in this example that Command3 indicates a Read operation, and that received packet 1132 has no payload data. The third I/O packet processing circuit 108-1 a portion of the fourth information structure 1000 of FIG. 14 and recognizes that the header information (Command3, LUN4) matches the key for packet flow 1F, which is associated in the structure 1000 with the endpoint destination address of the packet processing circuit that imparts service LUN4. Thus, in essence, the circuit 108-1 determines that the received packet is to be associated with the sequence of endpoints LUN4, 104-3, 104-2, 104-1 and 108-1 shown in FIG. 18C. In this example, one or more of the Flash storage devices (not shown), managed by the controller 180, is configured to manage LUN4. Accordingly, the third I/O packet processing circuit 108-1 adds the packet flow identifier 1F to the packet imparts the protocol conversion service and adds an endpoint destination address on the routing network 102-1 that indicates the network address of LUN4. The third I/O packet processing circuit 108-1 transmits the modified packet 1132 on to the routing network 102-1.

As indicated by the arrow 1133, in response to receiving the modified packet 1132, the routing circuit 102-1 transmits the packet to LUN4 The memory controller 180, which is configured according to the process 1400 of FIG. 17, recognizes the Command3 as a Read operation and retrieves the requested read data. The memory controller 180 recognizes the flow identifier 1F in the received packet and refers to the portion of its next hop data structure 900F that includes the association (1F, Svc C) to determine a next hop for the packet and modifies endpoint destination address information in the packet to indicate the endpoint destination address of the first packet processing circuit 104-3, which is configured to perform Service C. The memory controller 180 then transmits the modified packet on to the routing network 102-1.

As indicated by the arrow 1134, in response to receiving the converted packet 1132 with the modified destination address, the routing circuit 102-1 transmits the packet to the first packet processing circuit 104-3. It is noted that the packet transmitted to the first packet processing circuit 104-3 includes a payload, i.e. the retrieved Read data. The first packet processing circuit 104-3 identifies the flow identifier 1F in the received packet and imparts Service C to the packet. The first packet processing circuit 104-3 refers to the routing structure portion of its next hop data structure 900C that includes the association (1F, Svc B) to determine a next hop for the packet and modifies the endpoint destination address information in the packet so as to indicate the endpoint destination address of the first packet processing circuit 104-2, which is configured to perform Service B. The first packet processing circuit 104-3 then transmits the modified packet 1132 on to the routing network 102-1.

As indicated by the arrow 1136, in response to receiving the converted packet 1132 with the modified destination address, the routing circuit 102-1 transmits the packet to the first packet processing circuit 104-2. The first packet processing circuit 104-2 identifies the flow identifier 1F in the received packet and imparts Service B to the packet. The first packet processing circuit 104-2 refers to the routing structure portion of its next hop data structure 900B that includes the association (1F, Svc A) to determine a next hop for the packet; modifies the endpoint destination information in the packet so as to indicate the endpoint destination address of the first packet processing circuit 104-1, which is configured to perform Service A The first packet processing circuit 104-2 then transmits the modified packet 1132 on to the routing network 102-1.

As indicated by the arrow 1138, in response to receiving the converted packet 1132 with the modified destination address, the routing circuit 102-1 transmits the packet to the first packet processing circuit 104-1. The first packet processing circuit 104-1 identifies the flow identifier 1F in the received packet and imparts Service A to the packet. The first packet processing circuit 104-2 refers to the routing structure portion of its next hop data structure 900A that includes the association (1F, NIC) to determine a next hop for the packet and modifies the endpoint destination information in the packet so as to indicate the endpoint destination address of one or more of the NICs, which include first packet processing circuit 108-1, which is configured to perform a protocol conversion service. The first packet processing circuit 104-3 then transmits the modified packet 1132 on to the routing network 102-1.

As indicated by the arrow 1140, in response to receiving the converted packet 1132 with the modified destination address, the routing circuit 102-1 transmits the packet to the NIC circuit, which persons skilled in the art will appreciate, have the intelligence to determine that the third I/O packet processing circuit 108-1 is to receive the packet. The third I/O packet processing circuit 108-1 imparts its protocol conversion service to the packet, and transmits the converted packet 1132 on to the external network 106.

A distributed endpoint routing information structure corresponding to flow identifier F includes multiple routing information structure portions that are disposed at different packet processing circuits. A portion (1F, LUN4) is disposed at packet processing circuit 108-1. A portion (1F, Svc C) is disposed at the memory controller 180 that controls LUN4. A portion (1F, Svc B) is disposed at packet processing circuit 104-3. A portion (1F, Svc A) is disposed at packet processing circuit 104-2. A portion (1F, Svc NIC) is disposed at packet processing circuit 104-1. The individual next hop addresses associated with flow identifier 1F in the individual portions collectively define a sequence of next hop destination addresses and thereby define a sequence of services that correspond to a policy to be applied to a packet that contains the example key (Command3, LUN4).

The foregoing description and drawings of embodiments are merely illustrative of the principles of the invention. Therefore, it will be understood that various modifications can be made to the embodiments by those skilled in the art without departing from the spirit and scope of the invention, which is defined in the appended claims.

The invention claimed is:

1. A method for use with a packet routing network configured to route packets between endpoints coupled to the network, based at least in part upon destination endpoint address information within packets transmitted through the network, wherein one or more endpoints includes Flash storage that includes Flash storage locations, comprising:
    providing multiple endpoints configured to impart services to packets to alter packet payload content stored at one or more LUNs, wherein at least some of the endpoints are configured to impart services that are different from services imparted by other of the endpoints;
    providing a distributed routing structure that includes respective routing structure portions that are associated with respective endpoints and that indicate next hop destination endpoint addresses, wherein the indicated next hop destination endpoint addresses of the routing structure portions that are associated with different endpoints define multiple respective sequences of endpoints, wherein respective sequences of endpoints include one or more of the endpoints configured to impart one or more services to alter packet payload content stored at one or more LUNs and an endpoint that includes Flash storage that includes the one or more LUNs;
    receiving packets from an external network;
    for one or more of the received packets, determining whether to associate the received packet with a respective defined sequence of endpoints, based at least in part upon a Flash storage location associated with the received packet;
    in response to determining to associate the received packet with a respective defined sequence of endpoints, propagating the received packet through that associated sequence of endpoints;
    wherein propagating includes, receiving the packet in sequence order at each endpoint of the associated respective sequence of endpoints;
    at each respective endpoint of the sequence that is associated with one or more respective routing structure portions, modifying a current destination endpoint address within the received packet to include a next hop destination endpoint address indicated by an associated routing structure portion;
    at each endpoint of the sequence that is associated with a respective routing structure portion, transmitting the received packet with its modified next hop destination endpoint address on to the packet routing network; and
    in the course of propagating the received packet through the associated sequence of endpoints, at one or more successive endpoints that are configured to impart one or more services to alter packet payload content stored at one more LUNs, successively imparting those one or more services to the received packet to alter packet payload content stored at the one or more LUNs of the FLASH storage.

2. The method of claim 1, wherein the distributed routing structure includes, for each respective endpoint that is a part of one or more of the defined sequences of endpoints, a separate respective routing structure portion associated with the respective endpoint for each respective sequence of endpoints in which the respective endpoint is included.

3. The method of claim 1, wherein providing the distributed routing structure includes, for each of the multiple respective defined sequences of endpoints:
    associating each endpoint of the respective defined sequence of endpoints, which is not a last endpoint of the sequence, with a routing structure portion that includes a respective next hop address that indicates a next endpoint in the respective defined sequence.

4. The method of claim 1, wherein providing the distributed routing structure further includes, for each of the multiple respective defined sequences of endpoints:
    associating each respective endpoint of the respective defined sequence of endpoints, which is not a last endpoint of the sequence, with a respective routing structure portion that includes a respective next hop address that indicates a next endpoint in the respective defined sequence; and
    associating each respective routing structure portion with a respective flow identifier that corresponds to the respective defined sequence; and
    associating a respective endpoint, which is a part of more than one defined sequence of endpoints, with a respective different routing structure portion that includes a respective next hop endpoint destination address, for each defined sequence that it is a part of; and
    further including:
        in response to determining to associate the received packet with a respective defined sequence of endpoints, including a respective flow identifier within the received packet that corresponds to the respective defined sequence that the received packet is determined to associate with;

wherein modifying the destination endpoint address includes using the respective flow identifier included in the received packet to determine which portion associated with a respective endpoint includes the next hop endpoint address to use to modify the current destination endpoint address in the received packet.

5. The method of claim 1, wherein determining whether to associate the received packet with a respective defined sequence of endpoints includes determining, based at least in part upon a Flash storage location and a command associated with the received packet.

6. The method of claim 1, wherein determining whether to associate the received packet with a respective defined sequence of endpoints includes determining, based at least in part upon a Flash storage location and a Read command associated with the received packet.

7. The method of claim 1, wherein determining whether to associate the received packet with a respective defined sequence of endpoints includes determining, based at least in part upon a Flash storage location and a Write command associated with the received packet.

8. The method of claim 1, wherein the distributed routing structure includes routing structure portions that define at least one respective sequence of endpoints in which packets flow to an endpoint that includes Flash storage; and
wherein the distributed routing structure includes routing structure portions that define at least one respective sequence of endpoints in which packets flow from an endpoint that includes Flash storage.

9. The method of claim 1, wherein the distributed routing structure includes routing structure portions that define at least one respective sequence of endpoints in which packets flow to an endpoint that includes Flash storage and at least one endpoint is configured to impart a first service; and
wherein the distributed routing structure includes routing structure portions that define at least one respective sequence of endpoints in which packets flow from an endpoint that includes Flash storage and at least one endpoint is configured to impart a reverse of the first service.

10. The method of claim 1, wherein determining whether to associate the received packet with a respective defined sequence of endpoints includes determining, based at least in part upon a Flash storage location and a Read or a Write command associated with the received packet,
wherein the distributed routing structure includes routing structure portions that define at least one respective sequence of endpoints that corresponds to a Flash storage location and a Read command in which packets flow to an endpoint that includes Flash storage and in which at least one endpoint is configured to impart a first service; and
wherein the distributed routing structure includes routing structure portions that define at least one respective sequences of endpoints that corresponds to a Flash storage location and a Read command in which packets flow from an endpoint that includes Flash storage and in which at least one endpoint is configured to impart a first service.

11. The method of claim 1, wherein imparting the service includes modification of payload content of the received packet.

12. The method of claim 1, wherein more than one endpoint is configured to impart at least one of the respective services.

13. The method of claim 1, wherein the distributed routing structure determines the same routing for at least two different received packets associated with two different Flash storage locations.

14. The method of claim 1, wherein at least one sequence of endpoints includes a sequence of two or more respective endpoints associated with respective routing structure portions and an endpoint that includes Flash storage.

15. The method of claim 1, wherein at least one sequence of endpoints includes a sequence of three or more respective endpoints associated with respective routing structure portions and an endpoint that includes a Flash storage circuit.

16. The method of claim 1, wherein at least two sequences of endpoints include sequences of two or more respective endpoints associated with respective routing structure portions and an endpoint that includes Flash storage.

17. The method of claim 1, wherein at least three sequences of endpoints include sequences of two or more respective endpoints associated with respective routing structure portions and an endpoint that includes Flash storage.

18. The method of claim 1, wherein at least two sequence of endpoints include sequences of three or more respective endpoints associated with respective routing structure portions and an endpoint that includes Flash storage.

19. The method of claim 1, wherein at least one sequence of endpoints includes a sequence of two or more respective endpoints associated with respective routing structure portions and an endpoint that includes Flash storage, wherein at least two endpoints of the sequence of two or more respective endpoints impart different services.

20. The method of claim 1, wherein at least one sequence of endpoints includes a sequence of three or more respective endpoints associated with respective routing structure portions and an endpoint that includes a Flash storage circuit, wherein at least three endpoints of the sequence of three or more respective endpoints impart different services.

21. The method of claim 1, wherein at least two sequences of endpoints include sequences of two or more respective endpoints associated with respective routing structure portions and an endpoint that includes Flash storage, wherein at least one endpoint of one of the at least two sequences imparts a service that is not imparted by any endpoint of the other at least two sequences.

22. The method of claim 1, wherein at least three sequences of endpoints include sequences of two or more respective endpoints associated with respective routing structure portions and an endpoint that includes Flash storage, wherein at least one endpoint of each of the at least three sequences imparts a service that is not imparted by any endpoint of the other at least three sequences.

23. The system of claim 1, wherein at least two sequence of endpoints include sequences of three or more respective endpoints associated with respective routing structure portions and an endpoint that includes Flash storage, wherein at least one endpoint of one of each of the at least two sequences imparts a service that is not imparted by any endpoint of the other at least two sequences.

24. A method for use with a packet routing network configured to route packets between endpoints coupled to the network, based at least in part upon destination endpoint address information within packets transmitted through the network, wherein one or more endpoints includes Flash storage that includes Flash storage locations, comprising:
providing multiple endpoints configured to impart services to packets to alter packet payload content stored at one or more LUNs, wherein at least some of the endpoints are configured to impart services that are different from services imparted by other of the endpoints;

providing a distributed routing structure that includes respective information structures stored in storage devices disposed at respective endpoints that associate one or more of flow identifier-next hop destination endpoint addresses pairs, wherein combinations of flow identifier-next hop destination endpoint addresses pairs disposed at different endpoints define multiple respective sequences of endpoints, wherein respective sequences of endpoints include one or more of the endpoints configured to impart one or more services to alter packet payload content stored at one or more LUNs and an endpoint that includes Flash storage that includes the one or more LUNs;

receiving packets from an external network;

for one or more of the received packets, determining whether to associate the received packet with a respective defined sequence of endpoints, based at least in part upon a Flash storage location associated with the received packet;

in response to determining to associate the received packet with a respective defined sequence of endpoints, inserting a respective flow identifier within the received packet that corresponds to a respective defined sequence that the received packet is determined to associate with, propagating the received packet through that associated sequence of endpoints;

wherein propagating includes, receiving the packet in sequence order at each endpoint of the associated respective sequence of endpoints;

at each respective endpoint of the sequence that is associated with one or more respective routing structure portions, using the flow identifier inserted in the packet to identify a matching flow identifier-next hop destination endpoint addresses pair, and modifying a current destination endpoint address within the received packet to include a next hop destination endpoint address from the matching pair;

at each endpoint of the sequence that is associated with a respective routing structure portion, transmitting the received packet with its modified next hop destination endpoint address on to the packet routing network; and in the course of propagating the received packet through the associated sequence of endpoints, at one or more successive endpoints that are configured to impart one or more services to alter packet payload content stored at one more LUNs, successively imparting those one or more services to the received packet to alter packet payload content stored at the one or more LUNs of the FLASH storage.

25. The method of claim 24, further including:

providing a second information structure in a computer readable storage device that associates Flash storage locations with flow identifiers;

wherein determining whether to associate the received packet with a respective defined sequence of endpoints, includes using the second information structure to identify a flow identifier that is associated with the Flash storage location associated with the received packet.

* * * * *